(12) United States Patent
Cedar et al.

(10) Patent No.: US 11,059,559 B2
(45) Date of Patent: Jul. 13, 2021

(54) ACOUSTIC LINERS WITH OBLIQUE CELLULAR STRUCTURES

(71) Applicant: General Electric Company, Schenectady, NY (US)

(72) Inventors: Richard David Cedar, Montgomery, OH (US); Michael William Siekman, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 531 days.

(21) Appl. No.: 15/911,260

(22) Filed: Mar. 5, 2018

(65) Prior Publication Data

US 2019/0270504 A1 Sep. 5, 2019

(51) Int. Cl.
| | |
|---|---|
| *B64C 1/06* | (2006.01) |
| *B64C 1/40* | (2006.01) |
| *E04B 1/86* | (2006.01) |
| *F02K 1/82* | (2006.01) |
| *G10K 11/172* | (2006.01) |

(Continued)

(52) U.S. Cl.
CPC ............... *B64C 1/066* (2013.01); *B64C 1/40* (2013.01); *E04B 1/86* (2013.01); *F02C 7/045* (2013.01); *F02K 1/827* (2013.01); *G10K 11/168* (2013.01); *G10K 11/172* (2013.01); *B29L 2007/002* (2013.01); *B29L 2031/3076* (2013.01); *B64D 2033/0206* (2013.01); *E04B 2001/748* (2013.01); *E04B 2001/8428* (2013.01); *E04B 2001/8476* (2013.01); *F05D 2250/323* (2013.01); *F05D 2250/324* (2013.01)

(58) Field of Classification Search
CPC ............... E04B 1/86; E04B 2001/748; E04B 2001/8476; E04B 2001/8428; F02C 7/045; G10K 11/172; G10K 11/168; B29L 2007/002; B29L 2031/3076; B64D 2033/0206; F05D 2250/324; F05D 2250/323; B64C 1/40; B64C 1/066; F02K 1/827
USPC ........................................................ 181/285
See application file for complete search history.

(56) References Cited

U.S. PATENT DOCUMENTS

| 3,035,657 A | 5/1962 | Lemon |
| 3,070,198 A | 12/1962 | Haskell |

(Continued)

FOREIGN PATENT DOCUMENTS

| EP | 0405581 B1 | 10/1993 |
| EP | 0839101 B1 | 5/1998 |

(Continued)

OTHER PUBLICATIONS

U.S. Appl. No. 15/421,935, filed Feb. 1, 2017.

(Continued)

*Primary Examiner* — Forrest M Phillips
(74) *Attorney, Agent, or Firm* — Dority & Manning, P.A.

(57) ABSTRACT

The present disclosure provides acoustic structures and related systems and methods which may be used to dampen or attenuate sound waves, including, for example, noise generated by or emanating from various aspects or components of turbomachines such as turbine engines. These acoustic structures include oblique polyhedral cellular structures, including converging polyhedral cells and diverging polyhedral cells, and related systems and methods of making and using such acoustic structures.

20 Claims, 23 Drawing Sheets

(51) Int. Cl.
G10K 11/168 (2006.01)
F02C 7/045 (2006.01)
B29L 7/00 (2006.01)
B29L 31/30 (2006.01)
E04B 1/74 (2006.01)
E04B 1/84 (2006.01)
B64D 33/02 (2006.01)

(56) References Cited

U.S. PATENT DOCUMENTS

| | | |
|---|---|---|
| 3,232,371 A | 2/1966 | Reichert et al. |
| 3,734,234 A | 5/1973 | Wirt |
| 3,803,754 A | 4/1974 | Fischer |
| 3,819,009 A | 6/1974 | Mot |
| 3,831,710 A * | 8/1974 | Wirt .................. G10K 11/172 181/286 |
| 3,850,261 A | 11/1974 | Hehmann et al. |
| 3,887,031 A * | 6/1975 | Wirt ........................ E04B 1/86 181/286 |
| 3,905,443 A | 9/1975 | Sieuzac |
| 3,913,702 A | 10/1975 | Wirt et al. |
| 4,001,473 A | 1/1977 | Cook |
| 4,035,535 A | 7/1977 | Taylor |
| 4,074,496 A | 2/1978 | Fischer |
| 4,141,433 A | 2/1979 | Warnaka |
| 4,243,117 A | 1/1981 | Warnaka |
| 4,265,955 A | 5/1981 | Harp et al. |
| 4,291,080 A | 9/1981 | Ely et al. |
| 4,298,090 A | 11/1981 | Chapman |
| 4,339,018 A | 7/1982 | Warnaka |
| 4,551,110 A | 11/1985 | Selvage et al. |
| 4,676,762 A | 6/1987 | Ballard |
| 5,353,502 A | 10/1994 | Hattori et al. |
| 5,445,861 A | 8/1995 | Newton et al. |
| 5,480,729 A | 1/1996 | Hattori et al. |
| 5,690,035 A | 11/1997 | Hatayama et al. |
| 5,760,349 A * | 6/1998 | Borchers .................. B64G 1/002 181/286 |
| 5,959,264 A | 9/1999 | Brück et al. |
| 6,182,787 B1 | 2/2001 | Kraft et al. |
| 6,200,664 B1 | 3/2001 | Figge et al. |
| 6,203,656 B1 | 3/2001 | Syed |
| 6,206,136 B1 | 3/2001 | Swindlehurst et al. |
| 6,209,679 B1 | 4/2001 | Hogeboom et al. |
| 6,256,959 B1 | 7/2001 | Palmersten |
| 6,630,093 B1 | 10/2003 | Jones |
| 6,772,857 B2 | 8/2004 | Porte et al. |
| 6,840,349 B2 | 1/2005 | Andre et al. |
| 6,871,725 B2 | 3/2005 | Johnson |
| 6,884,486 B2 | 4/2005 | Estrin et al. |
| 6,913,570 B2 | 7/2005 | Kehrle |
| 7,410,455 B2 * | 8/2008 | Akishev .................. E04C 2/328 493/408 |
| 7,484,592 B2 | 2/2009 | Porte et al. |
| 7,510,052 B2 | 3/2009 | Ayle |
| 7,819,224 B2 * | 10/2010 | Borchers .................. F02C 7/24 181/292 |
| 7,866,377 B2 | 1/2011 | Slaughter |
| 7,906,205 B2 | 3/2011 | Meres |
| 7,921,966 B2 | 4/2011 | Chiou et al. |
| 7,935,205 B2 | 5/2011 | Bogue et al. |
| 7,954,224 B2 | 6/2011 | Douglas |
| 7,963,362 B2 | 6/2011 | Lidoine |
| 7,967,108 B2 | 6/2011 | Harper |
| 7,971,684 B2 | 7/2011 | Gantie et al. |
| 8,016,230 B2 | 9/2011 | Fogarty et al. |
| 8,047,326 B2 | 11/2011 | Valleroy et al. |
| 8,302,733 B2 | 11/2012 | Peiffer et al. |
| 8,464,831 B2 | 6/2013 | Olander Burak et al. |
| 8,579,076 B2 | 11/2013 | Ayle et al. |
| 8,689,936 B2 | 4/2014 | Richter |
| 8,784,592 B2 | 7/2014 | Kolax et al. |
| 8,789,652 B2 | 7/2014 | Swallowe et al. |
| 8,905,189 B2 | 12/2014 | Ayle et al. |
| 8,985,513 B2 | 3/2015 | Dean et al. |
| 8,997,923 B2 * | 4/2015 | Ichihashi .................. B32B 3/10 181/292 |
| 9,175,474 B2 | 11/2015 | May et al. |
| 9,222,229 B1 | 12/2015 | Chang et al. |
| 9,284,726 B2 | 3/2016 | Tien |
| 9,290,274 B2 | 3/2016 | Roach et al. |
| 9,296,044 B2 | 3/2016 | Douglas |
| 9,302,869 B2 | 4/2016 | Kendrick et al. |
| 9,365,022 B2 | 6/2016 | Kendrick et al. |
| 9,378,721 B2 | 6/2016 | Zalewski et al. |
| 9,514,734 B1 | 12/2016 | Jones et al. |
| 9,546,602 B2 | 1/2017 | Julliard et al. |
| 9,607,600 B2 | 3/2017 | Swallowe et al. |
| 9,693,166 B2 | 6/2017 | Herrera et al. |
| 9,759,447 B1 | 9/2017 | Mathur |
| 9,909,471 B2 | 3/2018 | Mattia |
| 9,978,354 B2 | 5/2018 | Nampy |
| 10,032,445 B1 | 7/2018 | Linch et al. |
| 10,107,139 B1 | 10/2018 | Jones et al. |
| 10,174,675 B2 | 1/2019 | Martinez et al. |
| 10,294,815 B2 * | 5/2019 | Runyan .................. B32B 3/12 |
| 10,414,481 B2 * | 9/2019 | Pierick .................. F02K 1/827 |
| 2001/0048027 A1 | 12/2001 | Walsh |
| 2004/0048027 A1 | 3/2004 | Hayes et al. |
| 2010/0307867 A1 | 12/2010 | Ogawa et al. |
| 2011/0100749 A1 | 5/2011 | Nonogi et al. |
| 2011/0244213 A1 * | 10/2011 | Jones .................. B32B 5/32 428/304.4 |
| 2013/0306402 A1 | 11/2013 | Todorovic |
| 2014/0133964 A1 | 5/2014 | Ayle |
| 2014/0251481 A1 | 9/2014 | Kroll et al. |
| 2014/0305529 A1 | 10/2014 | Kroll et al. |
| 2014/0341744 A1 | 11/2014 | Cazuc et al. |
| 2015/0027629 A1 | 1/2015 | Butler et al. |
| 2015/0044413 A1 | 2/2015 | Vauchel et al. |
| 2015/0064015 A1 | 3/2015 | Perez |
| 2015/0110603 A1 | 4/2015 | Biset et al. |
| 2015/0292413 A1 | 10/2015 | Soria et al. |
| 2015/0373470 A1 * | 12/2015 | Herrera .................. B32B 37/12 156/196 |
| 2016/0010863 A1 | 1/2016 | Ott et al. |
| 2016/0017775 A1 | 1/2016 | Mattia |
| 2016/0017810 A1 | 1/2016 | Lord et al. |
| 2016/0067938 A1 | 3/2016 | Goodrich |
| 2016/0109130 A1 | 4/2016 | Stastny et al. |
| 2016/0123160 A1 | 5/2016 | Strock et al. |
| 2016/0319690 A1 | 11/2016 | Lin et al. |
| 2017/0043550 A1 | 2/2017 | Coïc et al. |
| 2017/0045059 A1 | 2/2017 | Care et al. |
| 2017/0072638 A1 | 3/2017 | Hayes et al. |
| 2017/0191414 A1 | 7/2017 | Martinez et al. |
| 2018/0016987 A1 | 1/2018 | Howarth et al. |
| 2018/0162542 A1 | 6/2018 | VanDeMark et al. |
| 2018/0174568 A1 | 6/2018 | Porte et al. |
| 2018/0218723 A1 | 8/2018 | Lin et al. |
| 2018/0245516 A1 | 8/2018 | Howarth et al. |
| 2019/0080679 A1 | 3/2019 | Alstad |

FOREIGN PATENT DOCUMENTS

| | | |
|---|---|---|
| EP | 2960023 A1 | 12/2015 |
| EP | 3232434 A1 | 10/2017 |
| JP | S58156052 U | 10/1983 |
| JP | H0333897 A | 2/1991 |
| WO | WO2016/0133501 A1 | 8/2016 |

OTHER PUBLICATIONS

Jones, et al., Evaluation of Parallel-Element, Variable-Impedance, Broadband Acoustic Liner Concepts, AIAA-2012-2194, Jun. 2012.
Bertolucci, An Experimental Investigation of the Grazing Flow Impedance Duct at the University of Florida for Acoustic Liner Applications, University of Florida Dissertation, 2012, 217 Pages.
Bielak et al., Advanced Nacelle Acoustic Lining Concepts Development, NASA, CR-2002-211672, Aug. 2002, Total pp. 203.
European Search Opinion Corresponding to Application No. 19159934 dated Jul. 22, 2019.

(56) References Cited

OTHER PUBLICATIONS

European Search Report Corresponding to Application No. 19159934 dated Jul. 11, 2019.
Dai et al., Acoustic of a Perforated Liner with Grazing Flow: Floquet-Bloch Periodical Approach Versus Impedance Continuous Approach, Research Gate, The Journal of the Acoustical Society of America, Sep. 2016, 10 Pages. http://dx.doi.org/10.1121/1.4962490.
Dannemann et al., Experimental Study of Advanced Helmholtz Resonator Liners with Increased Acoustic Performance by Utilising Material Damping Effects, Applied Sciences, 2018, 18 Pages.
Jones, et al., Evaluation of Parallel-Element, Variable-Impedance, Broadband Acoustic Liner Concepts, AIAA-2012-2194, Jun. 2012, 17 Pages.
Kraft et al., Acoustic Treatment Design Scaling Methods, vol. 2: Advanced Treatment Impedance Models for High Frequency Ranges, NASA, CR-1999-209120, vol. 2, 1999, Total pp. 98.
Lawn, Acoustic Pressure Losses in Woven Screen Regenerators, ResearchGate, Applied Acoustics, vol. 77, Mar. 2014, pp. 42-48.
Malmary et al., Acoustic Impedance Measurement with Grazing Flow, AIAA-2001-2193, $7^{th}$ AIAA/CEAS Aeroacoustics Conference, May 2001, Netherlands, 9 Pages.
Martinson, Mechanical Design for 3D Printing, Nov. 2012, 15 pages. http://eikimartinson.com/engineering/3dparts/#dovetail.
Motsinger et al., Design and Performance of Duct Acoustic Treatment, NASA, N92-14783, 1991, pp. 165-206. https://ntrs.nasa.gov/archive/nasa/casi.ntrs.nasa.gov/19920005565.pdf.
Nark et al., Acoustic Liner Overview, Acoustics Technical Working Group Meeting, Nasa Langley Research Center, Cleveland, Oct. 22-23, 2019, pp. 1-25.

Primus et al., ONERA-NASA Cooperative Effort on Liner Impedance Education, AIAA 2013-2273, Research Gate, $19^{th}$ AIAA/CEAS Aeroacoustics Conference, May 2013, Germany, 16 Pages.
Schiller et al., Experimental Evaluation of Acoustic Engine Liner Models Developed with COMSOL Multiphysics, $23^{rd}$ American Institute of Aeronautics and Astronautics, DEAS Aeroacoustics Conference, NASA, 2017, 25 Pages. https://ntrs.nasa.gov/archive/nasa/casi.ntrs.nasa.gov/20170005768.pdf.
Sellen et al., Noise Reduction In a Flow Duct: Implementation of a Hybrid Passive/Active Solution, Science Direct, Journal of Sound and Vibration, vol. 297, 2006, pp. 492-511.
Soderman et al., Design and Development of a Deep Acoustic Lining for the 40-by 80 Foot Wind Tunnel Test Station, NASA TP-2002-211850, Nov. 2002, 61 Pages.
Syed et al., Paper No. 07ATC-43 Development of the Acousti-Cap™ Technology Double-Layer Acoustic Liners in Aircraft Engine Nacelles, Research Gate, 2007 SAE International, 23 Pages.
Tam et al., Experimental Validation of Numerical Simulations for An Acoustic Liner in Grazing Flow, 30 Pages. https://ntrs.nasa.gov/archive/nasa/casi/ntrs.nasa.gov/20130014086.pdf.
Tam et al., Numerical Simulation of a Slit Resonator in a Grazing Flow, AIAA 2006-799, $44^{th}$ AIAA Aerospace Meeting and Exhibit, Nevada, 2006, 20 Pages.
Zhang, Numerical Simulation of Two-Dimensional Acoustic Liners with High Speed Grazing Flow, MS Thesis, Urbana, Illinois, 2010, 90 Pages.
Zhou, Acoustic Characterization of Orifices and Perforated Liners with Flow and High-Level Acoustic Excitation, DiVA Digitala Vetenskapliga Arkivet, KTH Royal Institute of Technology School of Engineering Sciences (SCI), Aeronautical and Vehicle Engineering, MWL Flow Acoustics, Doctoral Thesis, Stockholm, p. vi, 2015 , 70 Pages. http://www.diva-portal.org/smash/record.jsf?pid=diva2:813073.

\* cited by examiner

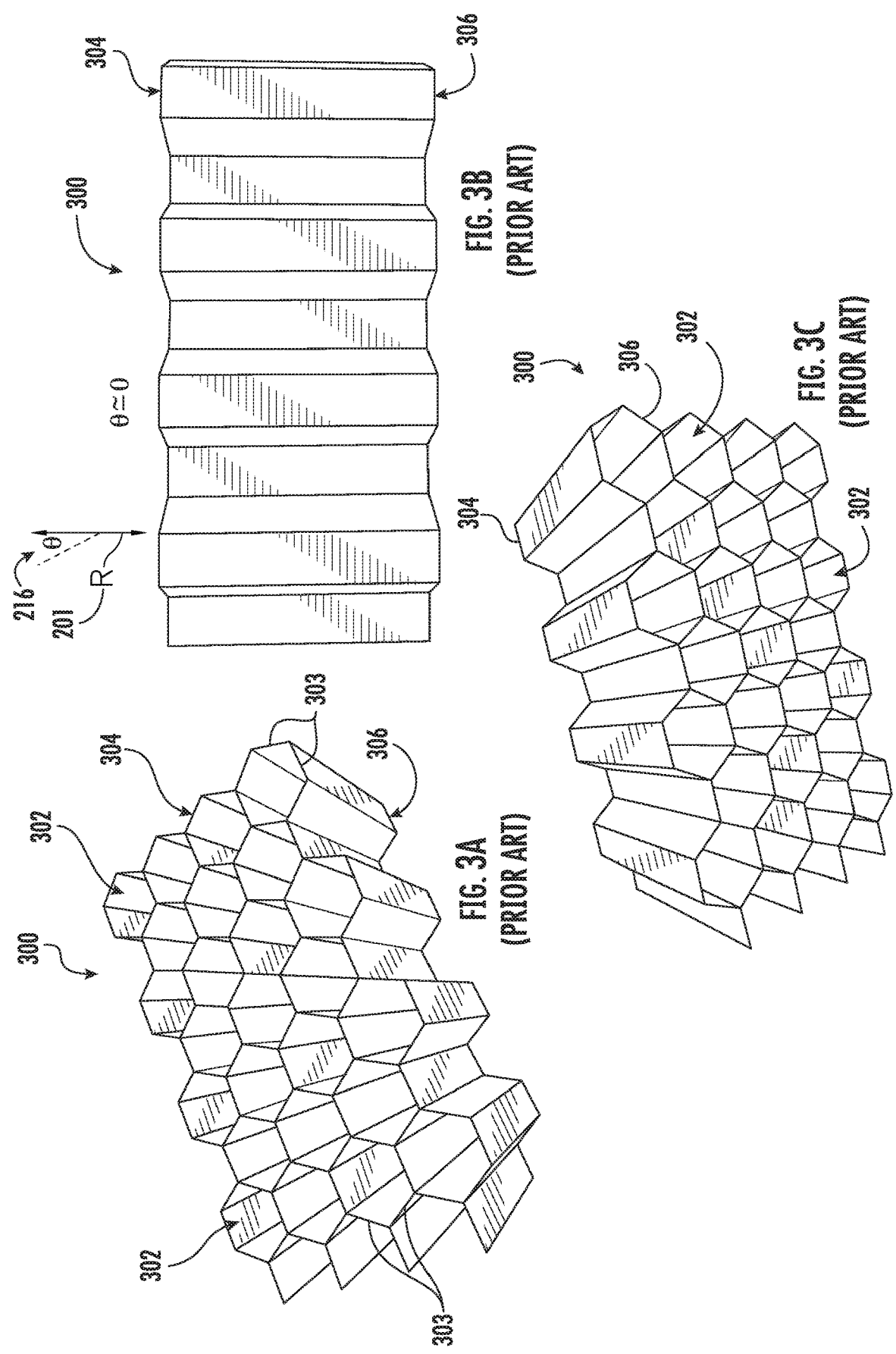

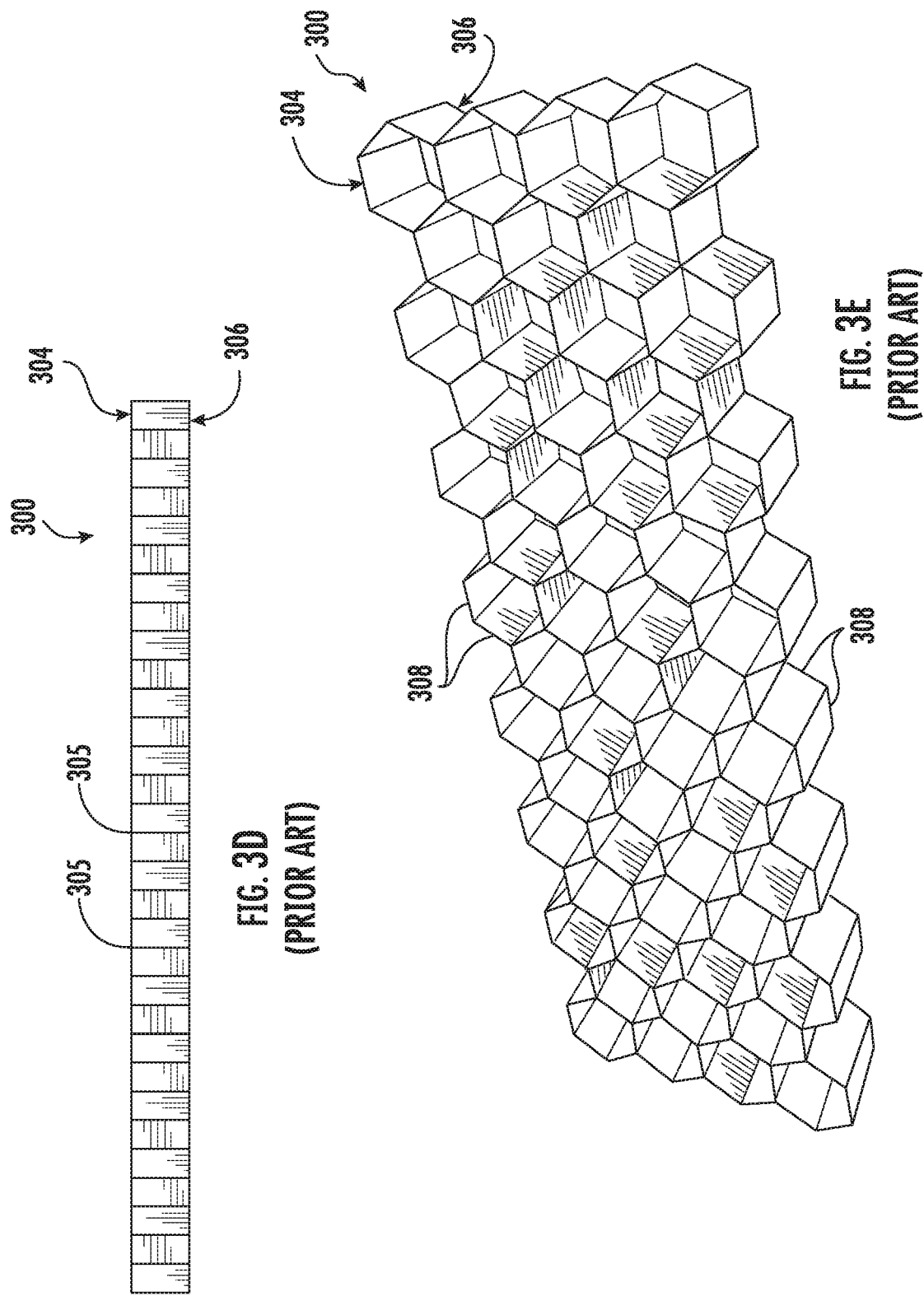

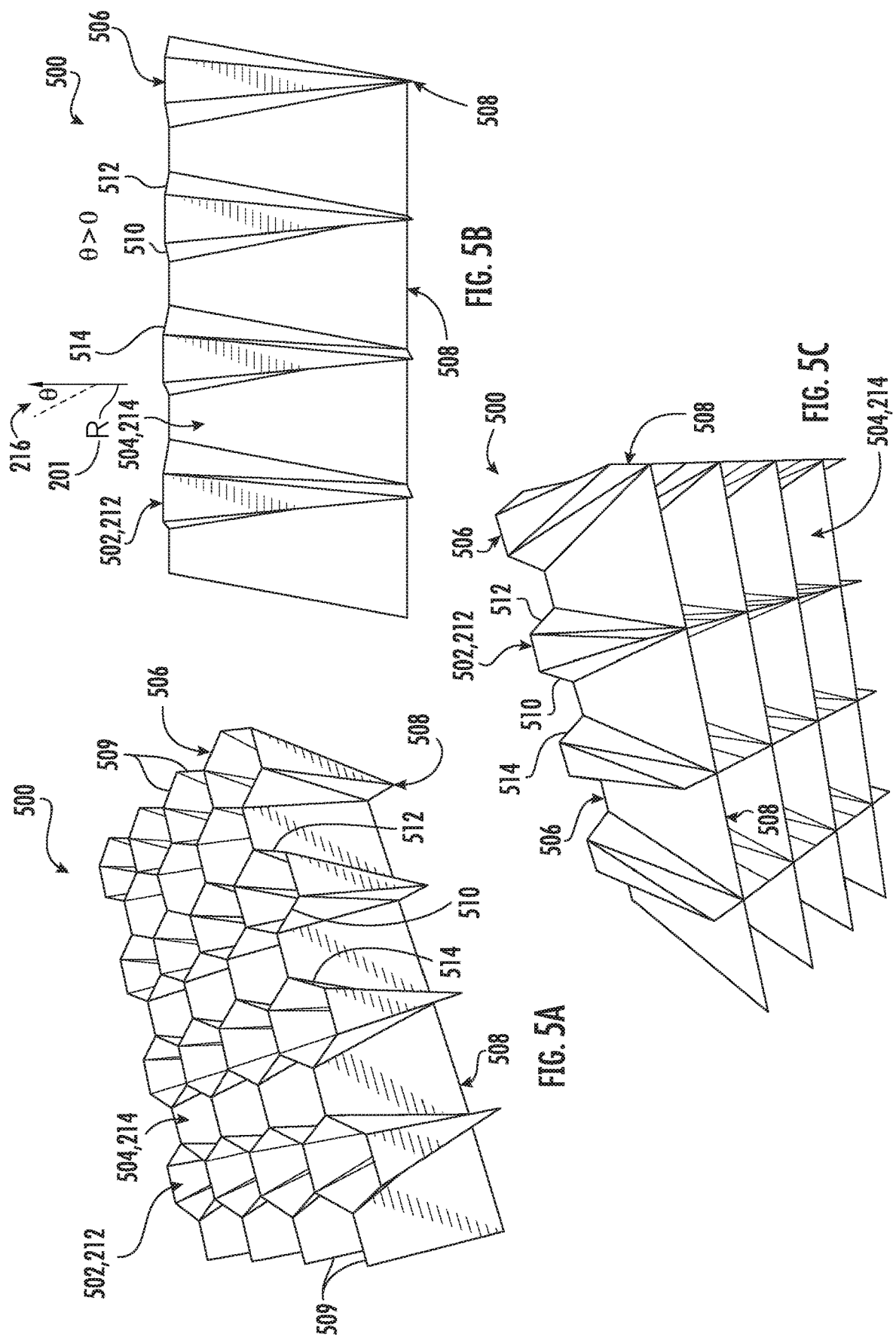

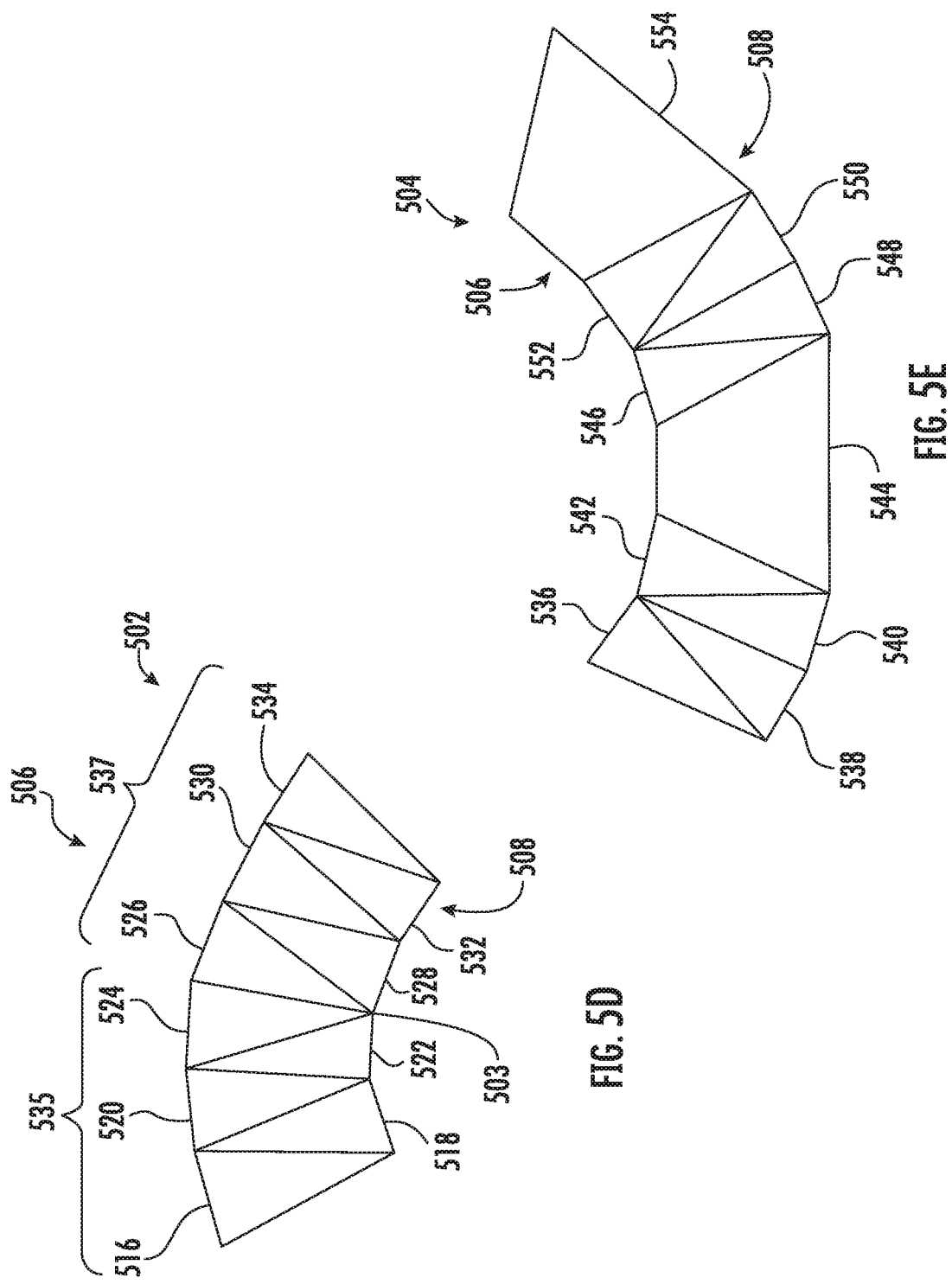

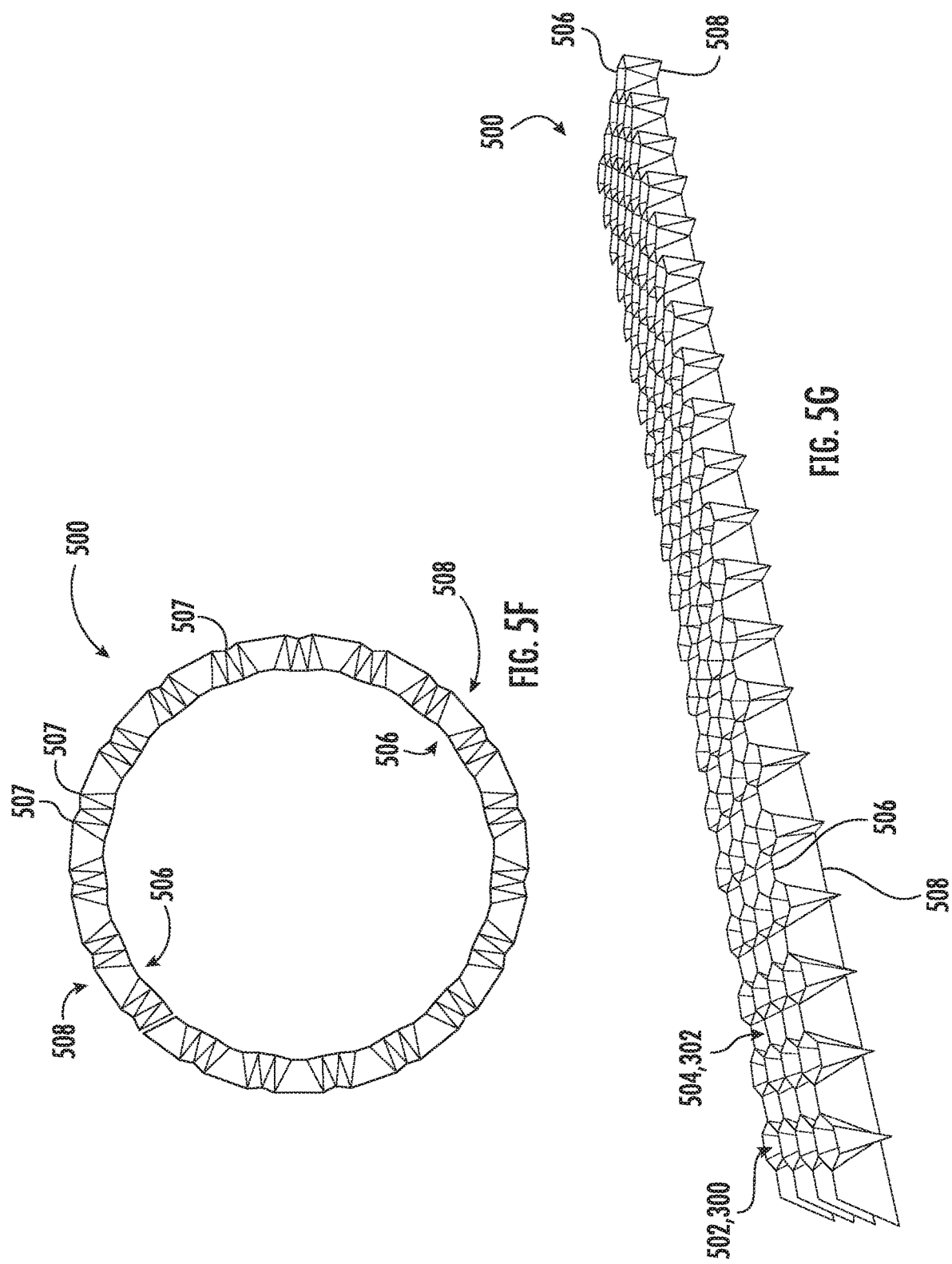

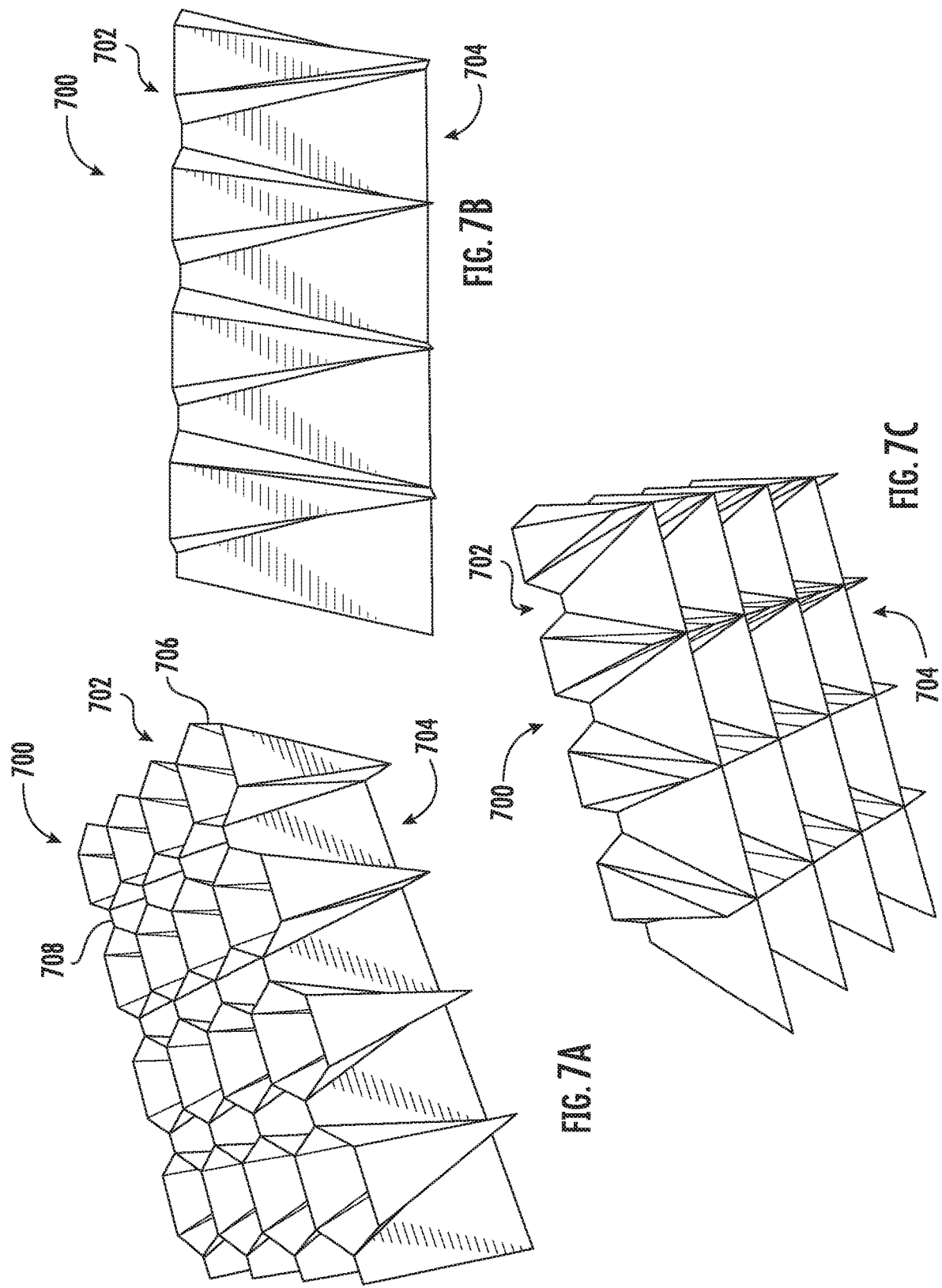

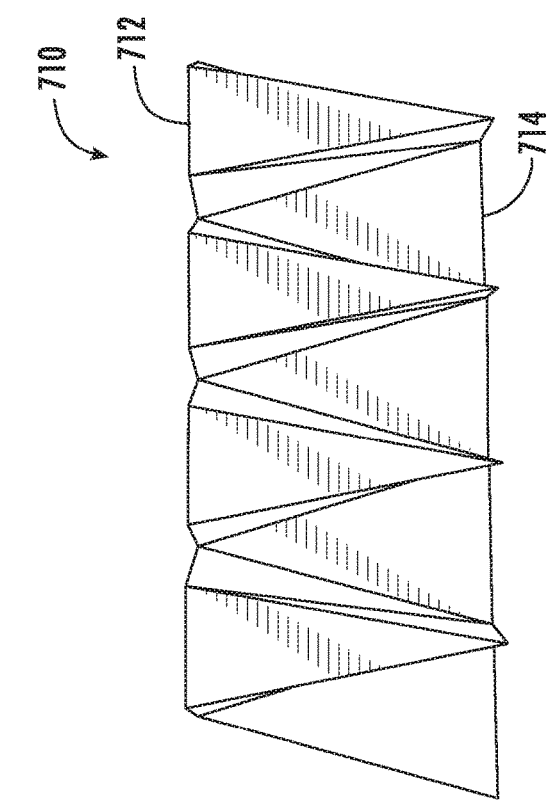
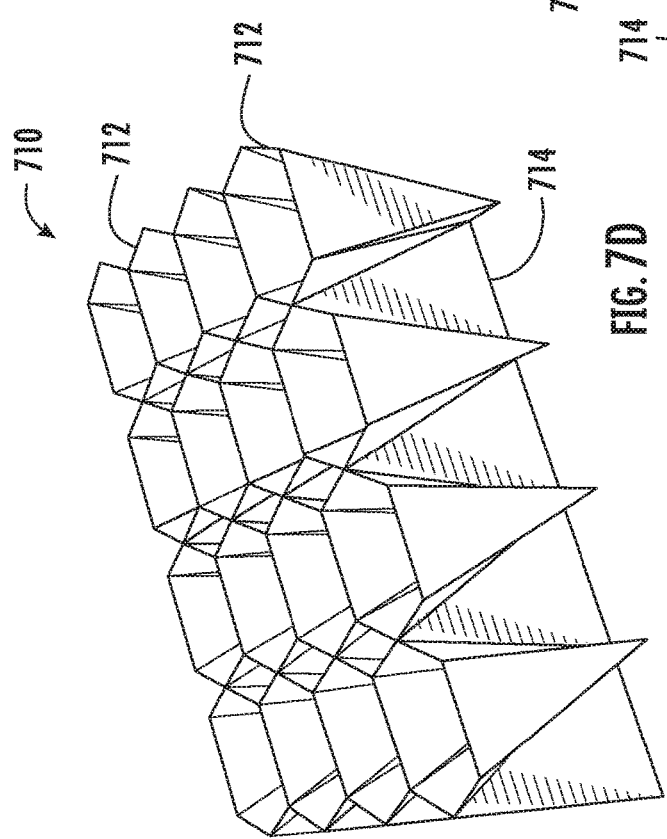
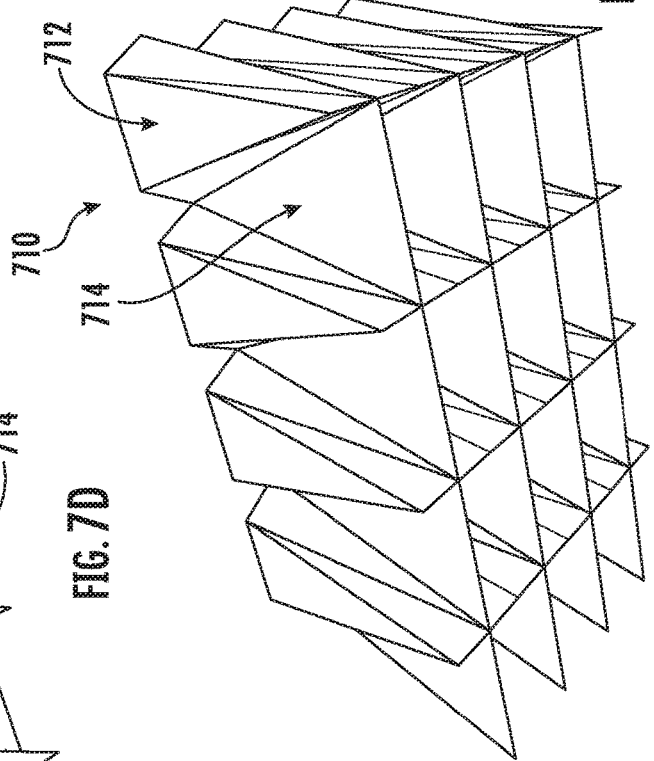
FIG. 7E
FIG. 7D
FIG. 7F

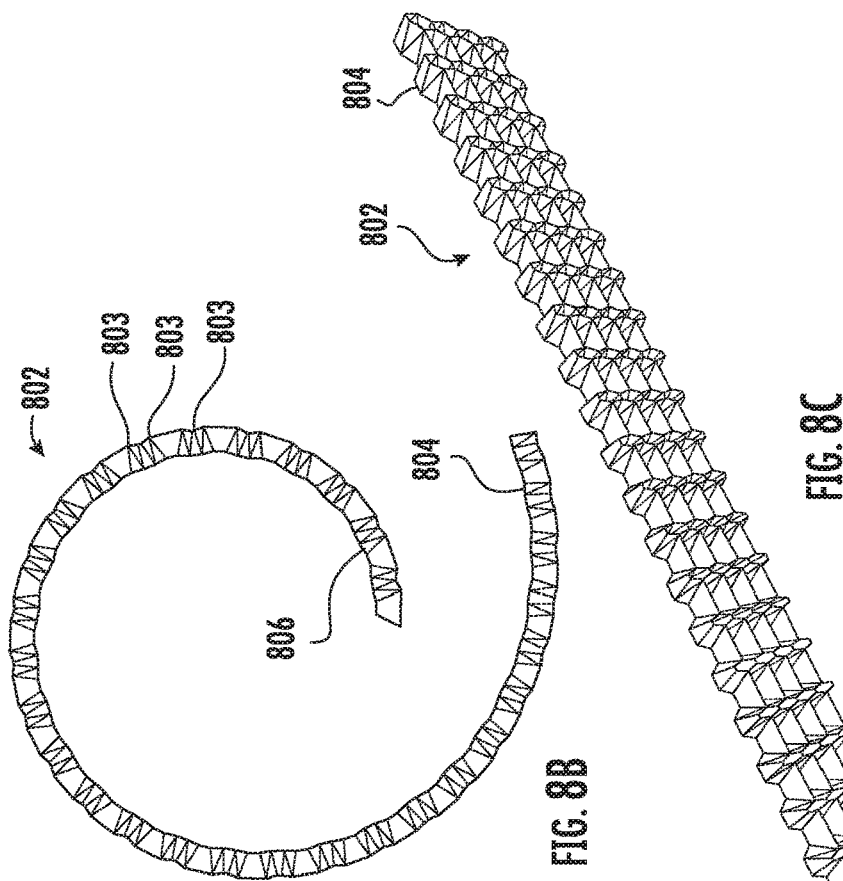
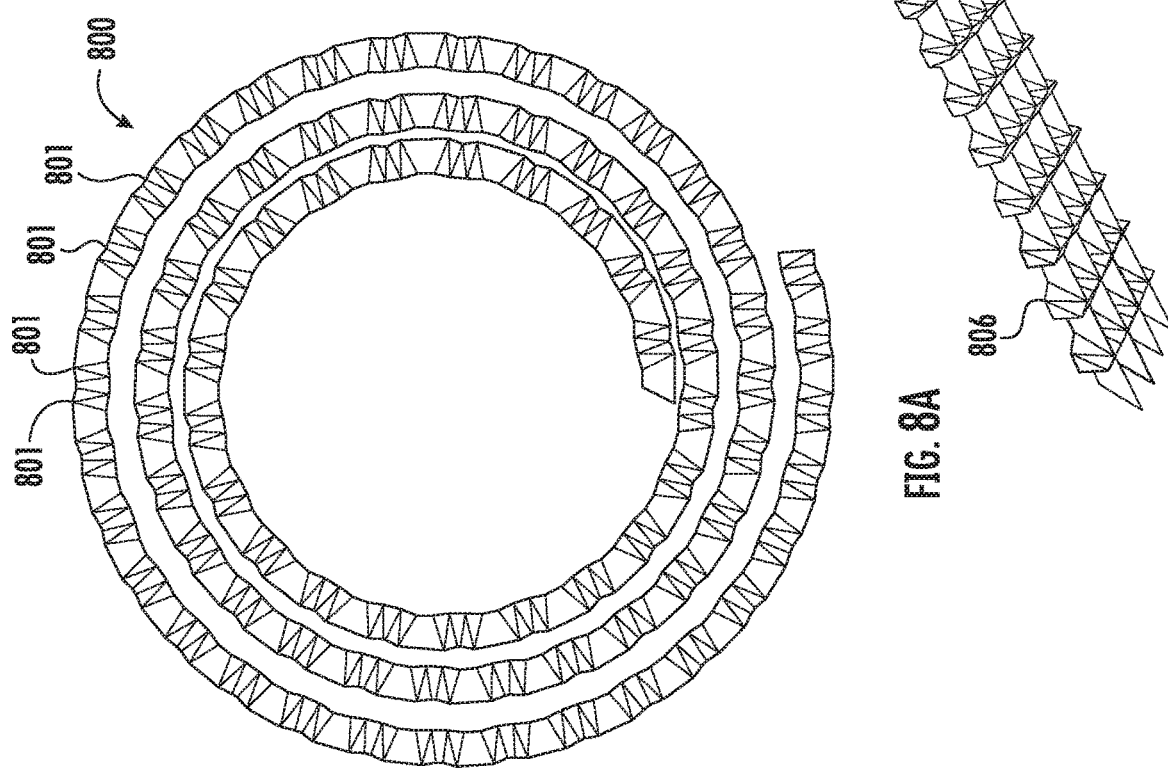
FIG. 8A
FIG. 8B
FIG. 8C

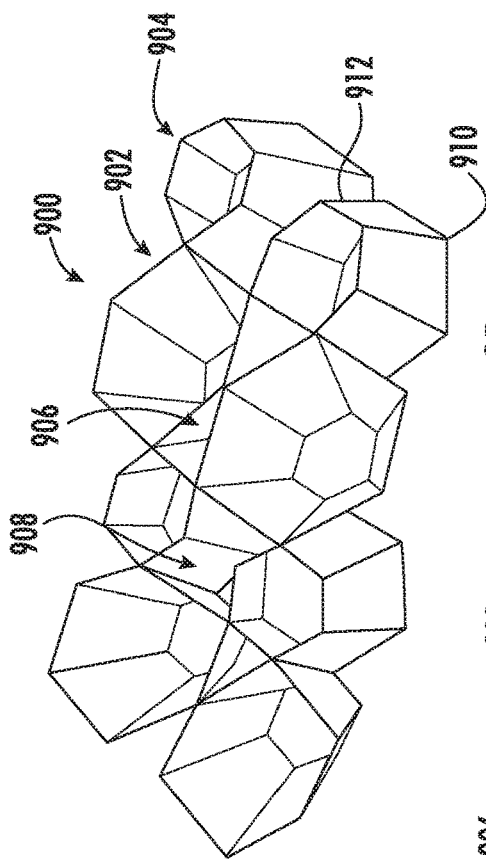
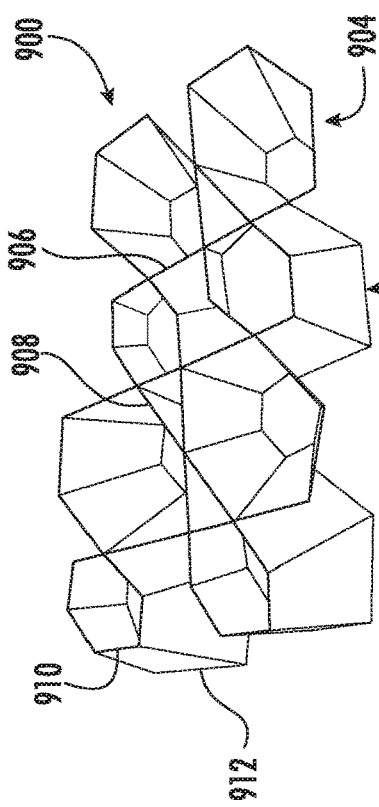
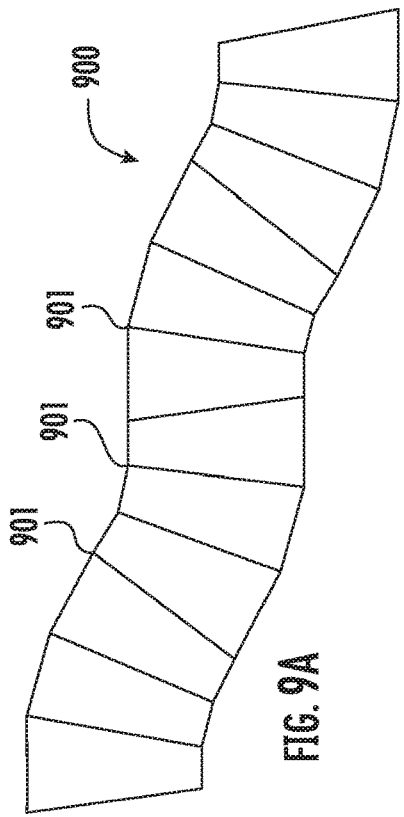
FIG. 9A
FIG. 9B
FIG. 9C

ACOUSTIC LINERS WITH OBLIQUE CELLULAR STRUCTURES

FIELD

The present disclosure generally relates to acoustic structures and related systems and methods which may be used to dampen or attenuate sound waves, including, for example, noise generated by or emanating from various aspects or components of turbomachines such as turbine engines. More particularly disclosed herein are acoustic structures that include oblique polyhedral cellular structures, including cellular structures providing continuous degree of freedom acoustic treatments, and related systems and methods of making and using such acoustic structures.

BACKGROUND

Aircraft engine noise can be a problem in high population areas and noise-controlled environments. The noise generally includes contributions from various source mechanisms in the aircraft, with fan noise typically being a dominant component of the noise at take-off and landing. Fan noise propagates through the engine intake duct, and then emanates to the outside environment. Acoustic structures such as liners are known to be applied on the internal walls of the nacelle to dampen or attenuate fan noise propagating through the engine ducts. These acoustic structures or liners typically include an array of honeycomb shaped cellular structures sandwiched between a porous face sheet a solid back sheet. The porous face sheet typically orientates towards the noise source, thereby allowing the sound waves to enter the cellular structure. The solid back sheet is substantially impervious to sound waves, thereby allowing the cellular structure or cells to act as acoustic resonators.

The acoustic damping or attenuation performance of previous acoustic liners typically depends on the depth of the cellular structures. The frequency of sound waves sufficiently dampened by a cellular structure generally correlated to cell depth, with lower frequencies calling for increased cell depth for sufficient damping or attenuation performance. Most commercial aircraft use turbomachines such as turbofan engines that have a high bypass ratio, meaning a relatively larger portion of fan air bypasses the turbine. This is because a high bypass ratio improves fuel consumption. However, high-bypass turbofan engines tend to emanate more sound at low frequencies, which calls for correspondingly deeper cellular structures that tend to increase the size and weight of acoustic liners.

Efforts to dampen or attenuate sound across the range of frequencies generated by turbofan engines face the problem of minimizing the size and weight of the acoustic liners while still providing sufficient noise reduction over a range of sound frequencies. Additional cellular structures may be added to respectively address different frequencies. For example, there are acoustic liners with two cellular layers separated by a porous septum sheet, referred to as two-degree-of-freedom liners. These additional cellular layers, however, tend to be heavier and more complicated and expensive to produce relative to single-degree-of-freedom liners which have only a single cellular layer. There are some single-degree-of-freedom liners with a cellular layer made up of individual cells with differing depths, which provide different resonant cavity volumes sized for different sound frequencies. However, these variable depth structures require a thicker core layer to accommodate the deeper individual cells and also are more expensive and complicated to produce. Additionally, the cells that have shorter depths typically have excess solid material between the bottom of the cell and the back sheet, which also adds to the overall weight of the cellular layer.

Commonly assigned U.S. application Ser. No. 15/421,935 addresses these and other shortcomings, the entirety of which patent application, publication document, and patents issuing therefrom are hereby incorporated by reference into this application. Nevertheless, there exists a need for further improved acoustic structures and liners. The present disclosure addresses the foregoing needs and shortcomings, for example, by providing the presently disclosed acoustic structures and related systems and methods.

BRIEF DESCRIPTION

Acoustic structures and related systems and methods are presently disclosed. The acoustic structures include an array of oblique polyhedral cellular structures. The oblique structures include converging polyhedral cells and/or diverging polyhedral cells, combinations of parallel and oblique cellular structures, and cellular structures providing continuous degree of freedom acoustic treatments. The acoustic structures may be used in acoustic liners to dampen or attenuate sound waves, including, for example, noise generated by or emanating from various aspects or components of a turbomachine. Typically the cellular structures are hollow.

Accordingly, in once aspect, the present disclosure embraces acoustic liners. In an exemplary embodiment, an acoustic liner may include a face sheet, a back sheet, and a core layer comprising a plurality of strips of core material configured to form an array of oblique polyhedral cellular structures. In another aspect, the present disclosure embraces a turbomachine that includes one or more acoustic liners. Such a turbomachine includes a turbine and a nacelle surrounding the turbine. The nacelle defines an inlet and a fan duct with a duct inner wall. The one or more acoustic liners may be disposed annularly along the duct inner wall.

In another aspect, the present disclosure embraces core materials for use in an acoustic liner and core layers made from such core materials. In an exemplary embodiment, a core material may be provided in the form of strips, which may be configured to form an array of cellular structures, including oblique or parallel cellular structures and combinations of these. For example, a plurality of strips of core material may be configured to form a core layer that has an array of oblique polyhedral cellular structures. The array of oblique cellular structures may include a plurality of converging polyhedral cells and a plurality of diverging polyhedral cells. In some embodiments the array may further include oblique polyhedral cells combined with parallel polyhedral cells. Some cellular structures may provide a continuous degree of freedom acoustic treatment.

In another aspect, the present disclosure embraces acoustic dampening and attenuation systems. These systems include combinations of acoustic liners and/or acoustic structures selectively placed at a plurality of locations around a noise source.

In another aspect, the present disclosure embraces methods of forming core materials, from which a core layer may be configured, and methods of forming such a core layer for use in an acoustic liner and methods of forming such an acoustic liner. An exemplary method of forming a core layer that has an oblique polyhedral cellular structure includes forming a plurality of strips of core material and selectively adhering the plurality of strips of core material to one another. The plurality of strips may be selectively adhered to one another at a multitude of adherence regions located at selected length intervals along respective strips. The exemplary method continues with concurrently or subsequently folding each of the plurality of strips of core material, thereby expanding or separating the strips from one another at a multitude of expansion regions respectively located between the multitude of adherence regions.

An exemplary method of forming an acoustic liner includes attaching a face sheet and a back sheet to a core layer that includes an array of oblique polyhedral cellular structures. The oblique polyhedral cellular structures may include a plurality of converging polyhedral cells and diverging polyhedral cells.

In another aspect, the present disclosure embraces methods attenuating or dampening sound such as turbomachine noise using the presently disclosed core materials, core layers, acoustic structures, and/or acoustic liners. In some embodiments, exemplary methods of attenuating noise from a source generating a sound wave stream may be performed using the acoustic liners and oblique polyhedral cellular structures of the present disclosure. Exemplary methods include receiving a sound wave stream including a plurality of frequency components at a first surface of a core layer of an acoustic structure and reflecting the sound wave stream from a first surface of an oblique polyhedral cell to a second surface of the oblique polyhedral cell and at least partially canceling at least some of the plurality of frequency components based on the reflecting. These methods result in absorbing a portion of an energy content of the reflected sound wave stream at each reflection.

The foregoing summary is illustrative only, and is not intended to be in any way limiting. In addition to the foregoing, further aspects, embodiments and features will become apparent by reference to the drawings, the following detailed description and the claims, as well as by practicing the presently disclosed subject matter.

BRIEF DESCRIPTION OF THE DRAWINGS

FIGS. 3A-3C respectively show a top perspective view, a side view, and a bottom perspective view of a core layer having a parallel polyhedral cellular structure.

FIG. 3D shows a side view of a pre-expanded core material that may be expanded to form a core layer having a parallel polyhedral cellular structure.

FIG. 3E shows a perspective view of a core layer having a parallel polyhedral cellular structure formed by expanding the core material of FIG. 3D.

FIGS. 5A-5C respectively show a top perspective view, a side view, and a bottom perspective view of a core layer having an exemplary array of oblique polyhedral cellular structures.

FIGS. 5D and 5E respectively show a converging polyhedral cell and a diverging polyhedral cell from the exemplary array of FIGS. 5A-5C, projected onto a two-dimensional space.

FIG. 5F shows a side view of an exemplary pre-expanded core material that may be expanded to form a core layer having an exemplary oblique polyhedral cellular structure.

FIG. 5G shows a perspective view of a core layer having an exemplary oblique cellular structure formed by expanding the core material of FIG. 5F.

FIGS. 7A-7C respectively show a top perspective view, a side view, and a bottom perspective view of an additional exemplary oblique polyhedral cellular structure, which has a different facing factor relative to the cellular structure shown in FIGS. 5A-5C.

FIGS. 7D-7F respectively show a top perspective view, a side view, and a bottom perspective view of yet another exemplary oblique polyhedral cellular structure, which has a maximum facing factor for the configuration of cells in the embodiments shown in FIGS. 7A-7I.

FIGS. 8A and 8B show side views of exemplary pre-expanded core materials that may be expanded to respectively form an exemplary oblique polyhedral cellular structure that has a varying frustum factor and/or a varying facing factor.

FIG. 8C shows a perspective view of an exemplary oblique polyhedral cellular structure formed by expanding the core material of FIG. 8C that has a varying frustum factor and/or a varying facing factor.

FIG. 9A shows another exemplary pre-expanded core material that may be expanded to form yet another exemplary oblique polyhedral cellular structure.

FIGS. 9B and 9C respectively show a top perspective view and a bottom perspective view of the exemplary oblique polyhedral cellular structure formed by folding and/or expanding the core material of FIG. 9A.

Figure 1:
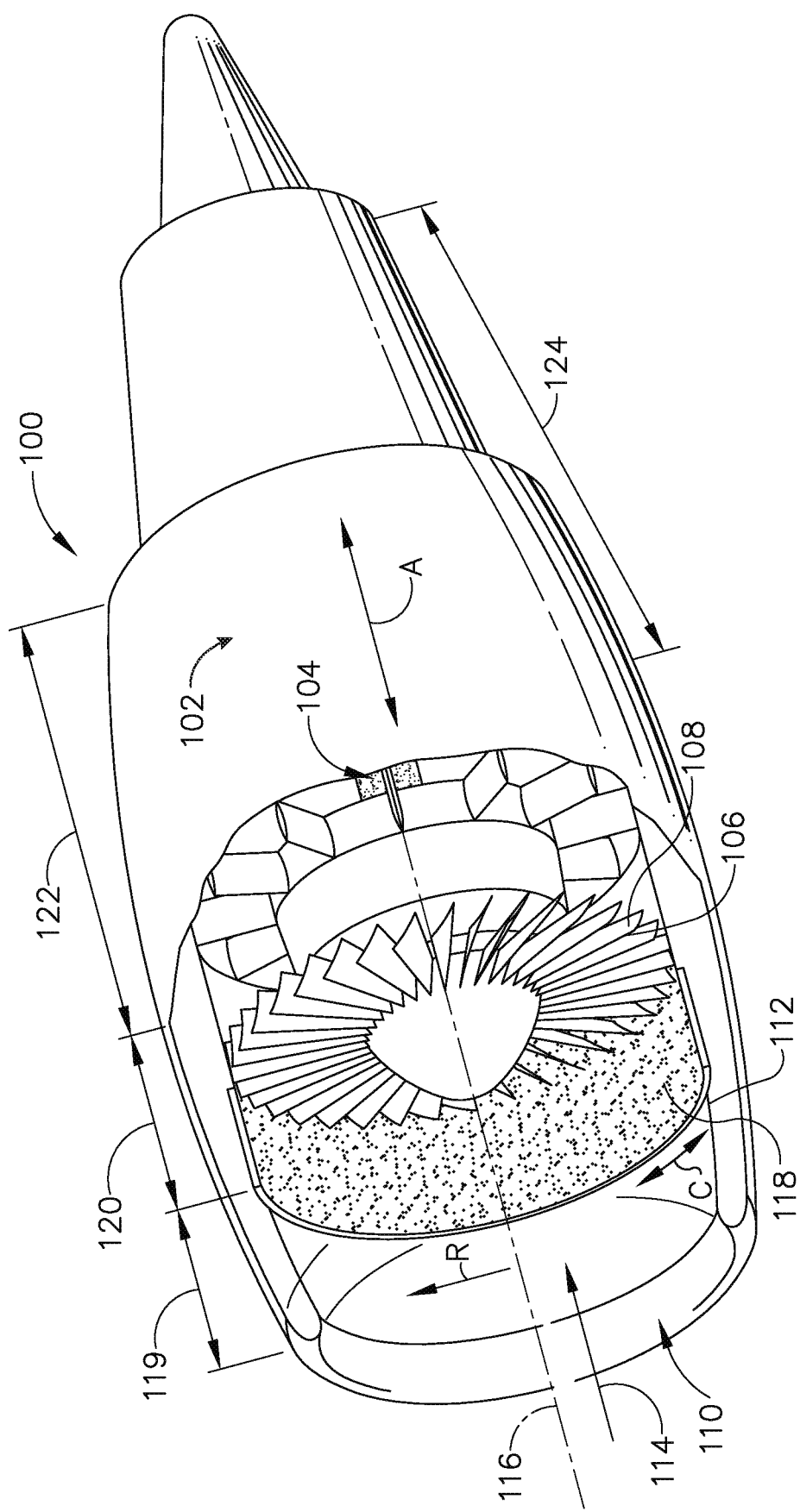
FIG. 1 shows a perspective partial cutaway view of a turbofan engine including an acoustic liner configured in accordance with the present disclosure.

Repeat use of reference characters in the present specification and drawings is intended to represent the same or analogous features or elements of the present disclosure.

DETAILED DESCRIPTION OF PARTICULAR EMBODIMENTS

Various aspects and features are described below in greater detail with reference to the appended figures, including among other things, exemplary acoustic liners, core layers for acoustic liners with oblique polyhedral cellular structures, turbomachines that utilize such acoustic liners, and related acoustic dampening and attenuation systems and methods. Numerous specific details are set forth in order to provide a thorough understanding of the presently disclosed subject matter. It will be apparent, however, to those skilled in the art, that the presently disclosed subject matter may be practiced without some or all of these specific details. In other instances, well known aspects and features have not been described in detail in order to not unnecessarily obscure the present disclosure. Those skilled in the art will also appreciate that various modifications and variations can be made to the disclosed subject matter without departing from the spirit and scope of the present disclosure. For instance, features illustrated or described as part of one embodiment can be used with other disclosed or known features to provide yet another exemplary embodiment. The following detailed description is therefore not to be taken in a limiting sense, and it is intended that other aspects, features, and embodiments are within the spirit and scope of the present disclosure.

Systems for damping or attenuating sound waves are described herein. These systems may be used, for example, to dampen or attenuate noise generated by or emanating from various aspects or components of turbomachines, such as turbofan engines commonly used in aircraft. These systems may similarly be used in numerous other classes of aircraft, including commercial, military, and civilian aircraft. These systems are effective for damping and attenuating noise from a wide variety of turbomachines, including, turbojets, turbofans, turboprops, turboshafts, ramjets, rocket jets, pulse-jets, turbines, gas turbines, steam turbines, marine engines, and the like. More broadly, these systems may be used to dampen or attenuate sound waves from any source that might be within the contemplation of those skilled in the art.

In FIG. 1, the turbofan engine 100 includes a nacelle 102 surrounding a turbine 104 and a fan rotor 106, which includes a plurality of circumferentially spaced fan blades 108 powered by the turbine 104. The nacelle 102 defines an inlet 110 and a fan duct having a duct inner wall 112 that directs airflow 114 downstream through the fan rotor 106, generally along a longitudinal axial centerline 116. In some embodiments, one or more acoustic liners provide a system for damping or attenuating sound waves. The system includes one or more acoustic liners 118 disposed annularly along the duct inner wall 112. The one or more acoustic liners 118 have a position along the duct inner wall 112 located upstream from the fan blades 108. One or more acoustic liners may also be positioned downstream from the fan blades 108. For example, an acoustic liner may be positioned at or aft of an inner barrel 119 portion of the nacelle 102. Additionally or alternatively, one or more acoustic liners 118 may be positioned at or aft of a fan casing portion 120 and/or a transcowl portion 122 of the nacelle 102. Additionally, one or more acoustic liners 118 may be positioned in proximity to non-rotating portions of the fan casing portion 120 or other components of the turbofan engine 100. These positions include ducts or casings within the turbofan engine 100 where an acoustic liner may be effective for noise suppression (e.g., damping or attenuation) at various frequency ranges. For example, one or more acoustic liners 118 may be positioned at a core cowl portion 124. Those skilled in the art will appreciate even further areas where acoustic liners may be positioned to dampen or attenuate noise generated by or emanating from various aspects of a turbofan engine.

For purposes of clarity, the terms "upstream" and "downstream" generally refer to a position in a jet engine in relation to the ambient air inlet and the engine exhaust at the back of the engine. For example, the inlet fan is upstream of the combustion chamber. Likewise, the terms "fore" and "aft" generally refer to a position in relation to the ambient air inlet and the engine exhaust nozzle.

In operation, a turbofan engine generates a tremendous amount of noise. Those skilled in the art may utilize the acoustic liners, systems, and methods disclosed herein in efforts to dampen or attenuate a maximum amount of engine noise. To illustrate a typical source of turbofan engine noise, it will be appreciated that the fan rotor 106 rotates within the fan casing portion 120, producing discrete tonal noise predominately at a blade passage frequency (BPF) and multiples thereof. During take-off of the aircraft, the fan blades 108 reach transonic and supersonic rotational velocities, generating noise that propagates out of the fan duct into the surrounding environment. In exemplary embodiments, one or more acoustic liners 118 are configured and arranged to suppress noise resonating at the BPF and harmonics of the BPF. In some embodiments, an acoustic liner 118 or various portions thereof may be configured to absorb one or more components of sound waves and thereby reduce the sound at specific frequencies. Some aspects of an acoustic liner 118 may be configured to reflect incident sound waves multiple times before the sound waves escape the acoustic liner 118. Without being bound to any particular theory, it is believed that these multiple reflections serve to reduce the amplitude of the sound waves. Additionally, some aspects of an acoustic liner 118 may be configured to cause sound waves to become out-of-phase. Without being bound to any particular theory, it is believed that when sound waves become out-of-phase, various portions of the sound waves tend to cancel one another, thereby reducing at least some of the energy in the sound waves. Without being bound to any theory, the acoustic liners 118 disclosed herein include various aspects and features configured to dampen or attenuate sound according to at least these modalities.

Figure 2A:
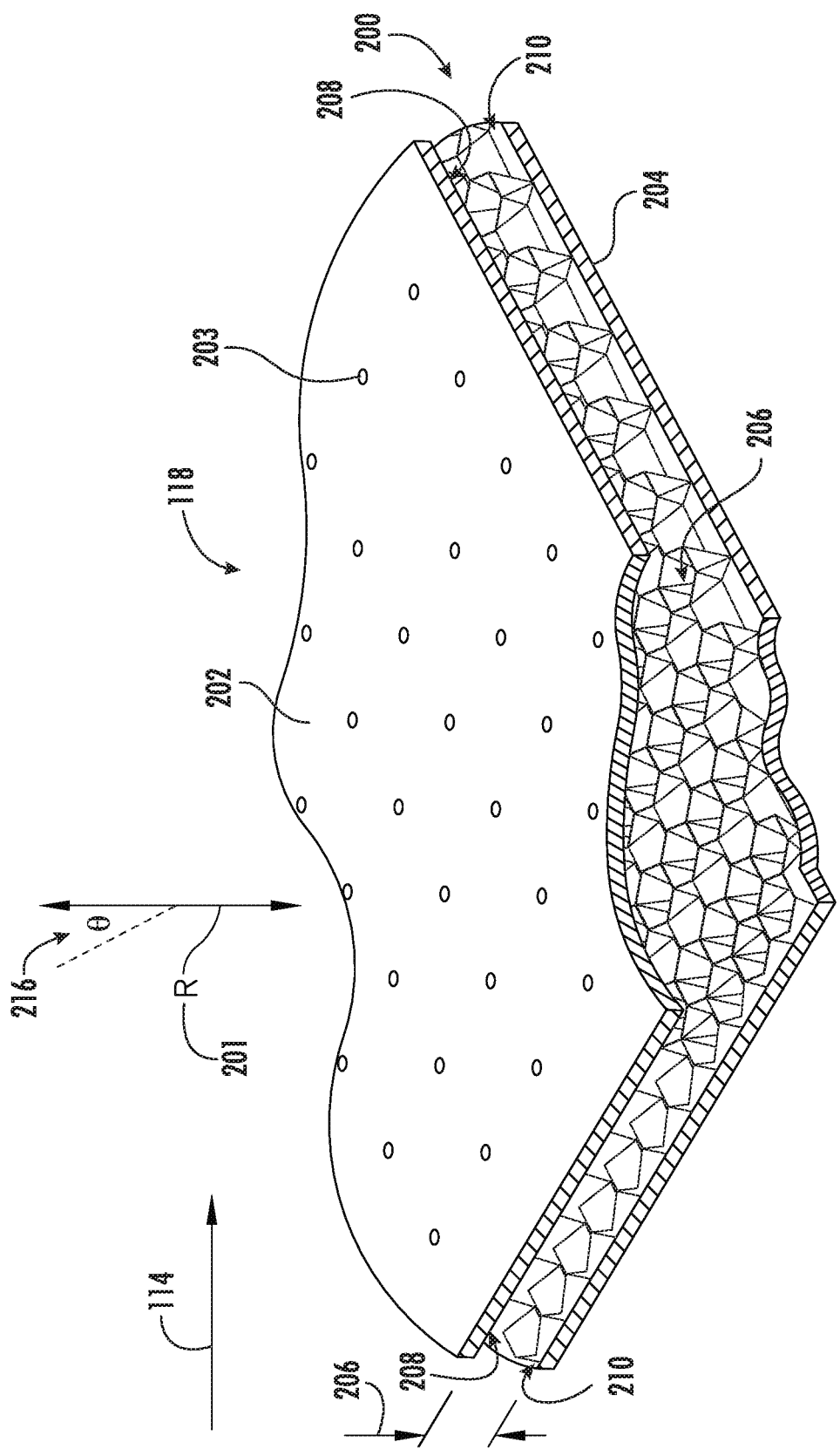
FIG. 2A shows an isometric partial cutaway view of a portion of an exemplary acoustic liner that may be used with a turbomachine such as the turbofan engine shown in FIG. 1.

FIG. 2A shows an isometric partial cutaway view of a portion of an exemplary acoustic liner 118. This acoustic liner may be configured for use with the turbofan engine shown in FIG. 1 or for attenuating noise from any other source within the contemplation of those skilled in the art. In some embodiments, the acoustic liner 118 may be disposed proximate to airflow 114 (also shown in FIG. 1). The acoustic liner 118 may be secured within the turbofan engine 100 by a flange or other attachment with the duct inner wall 112 and/or the fan casing portion 120. The acoustic liner 118 includes a core layer 200 positioned between a perforated face sheet 202 and a substantially imperforate back sheet 204. Typically the core layer is made up of hollow cellular structures. The face sheet 202 includes a plurality of perforations 203 extending through a material of construction of the face sheet 202, and positioned and spaced in at least one of a repeating pattern and a random pattern. The perforations 203 allow sound waves to enter the cellular structure of the core layer. The face sheet 202 may be formed of a wire mesh or a woven or nonwoven fibrous material that has perforations applied thereto or that has porous characteristics as formed. The face sheet 202 and back sheet 204 form planes having a generally parallel orientation relative to one another.

The core layer 200 may be secured between the face sheet 202 and the back sheet 204 using an adhesive process. For example a thermal, sonic, or electric welding process may be used. Alternatively, an adhesive formulation such as a thermosetting or pressure sensitive adhesive or an adhesive tape may be used to secure the core layer in position. A thickness or height of the core layer 200 may be defined by a distance taken along an axis R 201 (also shown in FIG. 1) between an inside surface of the face sheet 202 and an inside surface of the back sheet 204. A top face 208 defines a first linear or curved surface of the core layer 200 and a bottom face 210 defines a second linear or curved surface of the core layer. The top face 208 resides adjacent to and oriented towards the inside surface of the face sheet 202, and the bottom face 210 resides adjacent to and oriented towards the inside surface of the back sheet 204. The axis R 201 represents a normal line relative to the normal surface corresponding to the top face and/or the bottom face. The axis R may be a radial or other axis as the context requires. In this exemplary embodiment, the terms "inner" and "outer" refer to the orientation of the respective layers in relation to the longitudinal axial centerline 116 shown in FIG. 1.

The face sheet 202, the back sheet 204, and the core layer 200 may together form an arcuate cylindrical acoustic liner 118 (see, e.g., FIG. 1), a portion of which is shown in FIG. 2A. A noise source (e.g., fan blades 108 of fan rotor 106) is thus positioned within the arcuate cylindrical acoustic liner 118. The porous face sheet 202 of the acoustic liner typically orientates towards the noise source, with the back sheet 204 typically being more distal from the noise source relative to the face sheet 202. In an alternative embodiment, the face sheet 202, the back sheet 204, and the core layer 200 may together form an acoustic liner 118 that has a substantially flat planar profile. For example, and without limitation, an enclosed volume such as a room or an engine casing may contain a noise source such as noisy machinery, and one or more walls or other aspects of such an enclosed volume may be lined with a substantially flat acoustic liner 118.

Figure 2B:
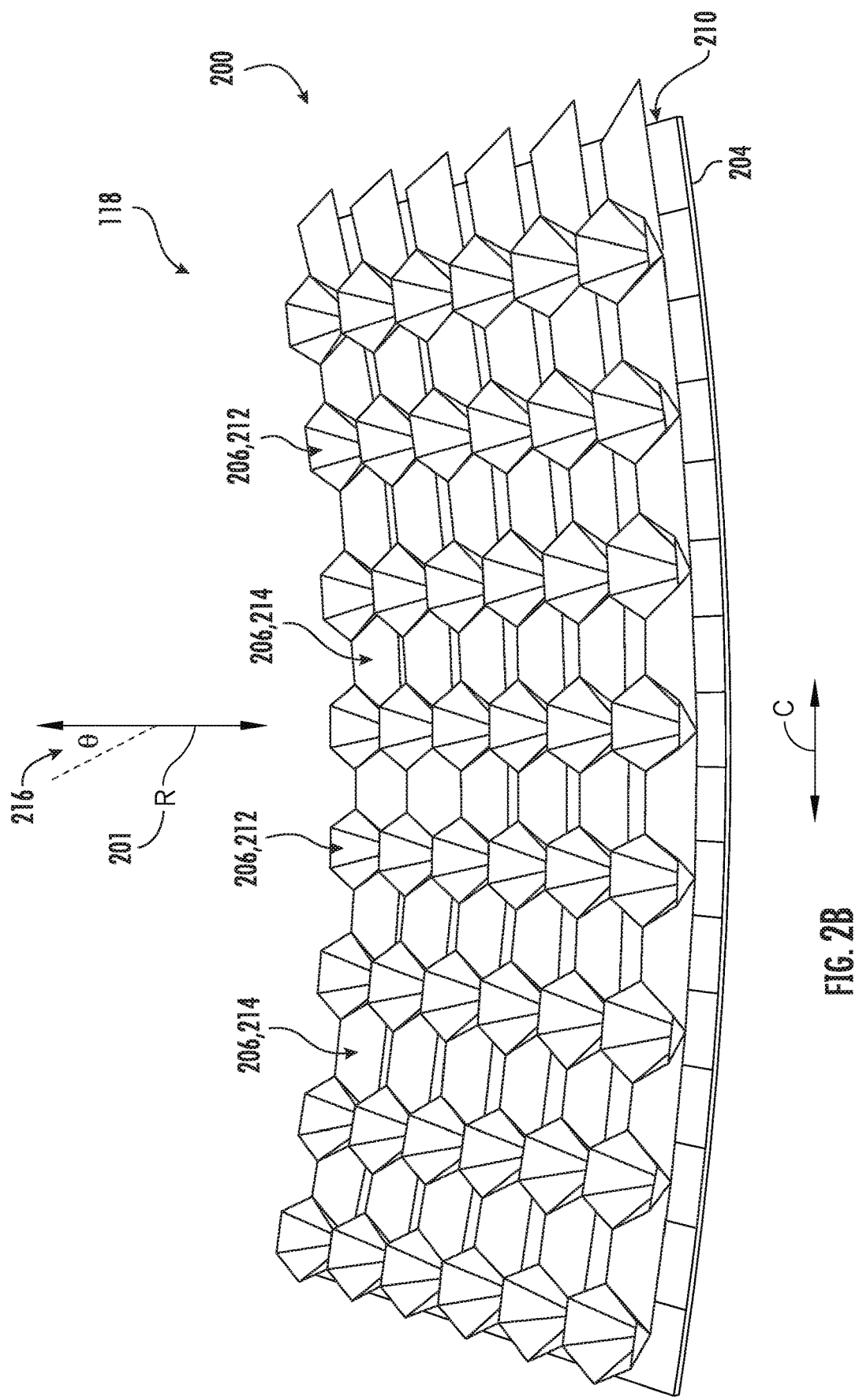
FIG. 2B shows an isometric perspective view of a portion of an exemplary acoustic liner that may be used with a turbomachine such as the turbofan engine shown in FIG. 1, with the face sheet removed to reveal an exemplary core layer.

In still other embodiments, the face sheet 202, the back sheet 204, and the core layer 200 may together form a complexly curved acoustic liner 118. For example, and without limitation, one or more complexly curved walls or other aspects of a nacelle or a noise source-containing room or space may be at least partially lined with a complexly curved acoustic liner 118. For example, FIG. 2B shows a more detailed view of a portion of an exemplary curved acoustic liner. The curve may be configured to correspond to the contour of a mounting location, such as a location 112, 119, 120, 122 within a nacelle 102 of a turbofan engine 100. The face sheet 202 of the acoustic liner 118 has been omitted from FIG. 2B to further illustrate the core layer 200. The core layer 200 includes an array of oblique polyhedral cellular structures defined by a plurality of adjacent cells 206. The oblique polyhedral cellular structures extend between the face sheet 202 and the back sheet 204. These polyhedral cellular structures may include parallel polyhedral cells and/or oblique polyhedral cells. The oblique polyhedral cells may include converging polyhedral cells 212, and diverging polyhedral cells 214. Numerous exemplary cellular structures or cells are discussed in more detail below.

The core material may be formed from any combination of materials known in the art, including one or more of a synthetic fiber and a metal alloy. Exemplary metal alloys include aluminum alloys, steel alloys, and superalloys, such as austenitic nickel-chromium-based superalloys. Exemplary synthetic fibers include aramid fiber, meta-aramid fiber, para-aramid fiber, carbon fiber, polyethylene fiber, rayon, polyester, and nylon. Additionally, the core material may be formed from any other suitable materials known in the art, all of which are within the spirit and scope of the present disclosure.

Parallel Polyhedral Cellular Structures

Parallel polyhedral cellular structures generally have geometric characteristics reflecting a right prism or a substantially right prism. A right prism is a polyhedron composed of an n-sided polygonal top face, a bottom face which is a translated copy of the top face without rotation, and n-number of rectangular lateral faces bisected by the top face and the bottom face. Given these characteristics of a right prism or substantially right prism, parallel polyhedral cellular structures have lateral faces that are substantially parallel to the normal line represented by the axis R 201. For example, FIGS. 3A-3E show a core layer 300 that has a parallel polyhedral cellular structure. In FIGS. 3A-3C, the core layer 300 has a plurality of polyhedral cells 302 that exhibit geometric characteristics of a hexagonal prism or a "honeycomb" structure. The polyhedral cells 302 have a plurality of lateral polygonal faces 303 bisected by a top face 304 and a bottom face 306. The top face 304 and the bottom face 306 are substantially parallel to one another and have substantially the same surface area as one another. The lateral faces 303 are substantially parallel to the normal line 201 and have a convergence angle $\theta$ (theta) 216 of zero or approximately zero. Parallel cellular structures, however, are not limited to those structures with identically sized lateral rectangular faces, nor to those structures with identical internal angles between adjacent lateral rectangular faces. Rather, parallel cellular structures include those structures with differently sized lateral rectangular faces and correspondingly differing internal angles between adjacent lateral rectangular faces. Such parallel cellular structures nevertheless have a top face 304 and a bottom face 306 with substantially the same surface area. Also, it will be appreciated that parallel cellular structures may not exhibit perfect symmetry due to minor imprecision in manufacturing processes and the like leading to imperfect symmetry in the cellular structures.

Oblique Polyhedral Cellular Structures

In contrast with parallel cellular structures, oblique polyhedral cellular structures have polyhedral cells with least one lateral face that either converges or diverges relative to the normal line represented by the axis R 201 at a convergence angle θ (theta) 216 greater than zero degrees. A wide variety of convergence angles and/or divergence angles may be provided. For example, in various embodiments, a convergence angle θ (theta) 216 may fall within a range from greater than zero to 10 degrees, 20 degrees, 30 degrees, or 45 degrees. In some embodiments, a convergence angle may fall within a range from 1 to 30 degrees, such as from 2 to 10 degrees, or 5 to 15 degrees, or 10 to 20 degrees, or 15 to 30 degrees.

Figure 4:
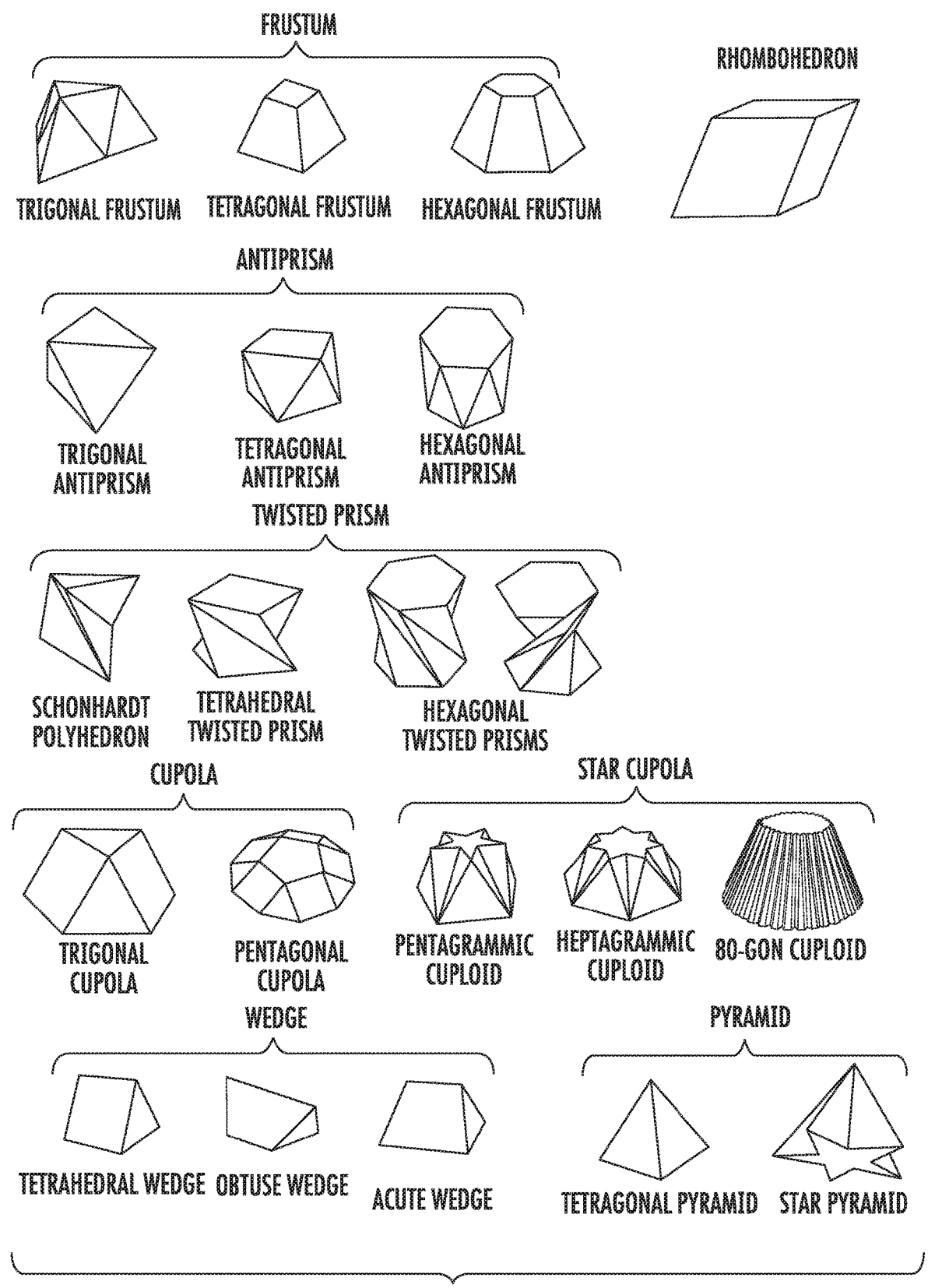
FIG. 4 shows several exemplary oblique polyhedral cells that may be included in an oblique polyhedral cellular structure.

Numerous various oblique polyhedral structures are within the scope and spirit of the present disclosure, including but not limited to the exemplary embodiments that follow. FIG. 4 shows numerous exemplary oblique polyhedral configurations that may be incorporated into an oblique polyhedral cellular structure in accordance with the present disclosure. By way of example, FIG. 5A through FIG. 14 show various embodiments of cellular structures that include oblique polyhedral cells. These examples include several of the oblique polyhedral configurations shown in FIG. 4 and combinations thereof. An oblique polyhedral cell may take the form of any one of these or other exemplary oblique polyhedral configurations.

In some embodiments an exemplary oblique polyhedral cell may include one or more aspects of a particular polyhedral configuration. For example, a portion, but not all, of a particular polyhedral configuration may exist in an exemplary oblique polyhedral cell. Additionally, or in the alternative, a combination of aspects from more than one polyhedral configuration may exist in an exemplary oblique polyhedral cell. In some embodiments, one or more aspects of a parallel polyhedral cellular structure may be combined with one or more aspects of a first oblique polyhedral cellular structure, to yield a second oblique polyhedral cellular structure.

Referring to FIG. 4, exemplary oblique polyhedral cellular structures include a frustum, a rhombohedron, an antiprism, a twisted prism, a cupola (including a star cupola), a wedge, a pyramid, and combinations or portions of these. By way of example, a frustum may include a trigonal frustum, a tetragonal frustum, a pentagonal frustum, a hexagonal frustum, a heptagonal frustum, an octagonal frustum, a nonagonal frustum, a decagonal frustum, a hendecagonal frustum, a dodecagonal frustum, any other frustal polyhedron, and combinations of these. A frustal polyhedron includes a frustum combined with another polyhedron, including any of the aforementioned frustum shapes combined with another polyhedron. For example, a rhombohedron may be formed from any rhombus, providing a rhombal polyhedron. As a further example, a rhombohedron may be combined with a frustum to form a rhombohedral frustum.

An antiprism includes a polyhedron composed of a polygonal top face, a polygonal bottom face, and a sequence of adjacent trigonal lateral faces with alternating orientations, bisected by the top face and the bottom face. By way of example, an antiprism may include a trigonal antiprism, a tetragonal antiprism, a hexagonal antiprism, an antiprismal polyhedron, and combinations of these. An antiprismal polyhedron includes an antiprism combined with another polyhedron. In some embodiments, an antiprism may include an n-sided top face and an n-sided bottom face. Alternatively, an antiprism may include an n-sided top face and a bottom face with greater than or less than n-sided.

A twisted prism includes a polyhedron composed of a polygonal top face, a polygonal bottom face, and a plurality of lateral faces including at least some lateral faces bisected on a diagonal, with the top face and the bottom face twisted relative to one another, causing at least some adjacent lateral faces to be concave relative to one another. By way of example, a twisted prism may include a Schönhardt polyhedron, a tetrahedral twisted prism, a hexagonal twisted prism, a twisted prismal polyhedron, and combinations of these. A twisted prism has one or more lateral faces bisected on an adjacent diagonal or on a subsequent diagonal. For example, FIG. 4 shows a hexagonal twisted prism with lateral faces bisected on an adjacent diagonal, and a hexagonal twisted prism with lateral faces bisected on a second diagonal. A twisted prismal polyhedron includes a twisted prism combined with another polyhedron.

A cupola includes a polyhedron composed of a polygonal top face, a polygonal bottom face, and a plurality of lateral faces including an alternating sequence of trigonal lateral faces and tetragonal lateral faces. In some embodiments, a cupola has a top face with twice as many edges as that of its bottom face, or vice versa. By way of example, a cupola includes a trigonal cupola, which has a tetragonal top face and a hexagonal bottom face, or a hexagonal top face and a tetragonal bottom face; and a pentagonal cupola, which has a pentagonal top face and a decagonal bottom face, or vice versa. A cupola also includes star cupola, which is a cupola in which tetragonal lateral faces are replaced with adjacent concave trigonal lateral faces. Star cupola include a pentagrammic cuploid and a heptagrammic cuploid. A pentagrammic cuploid has a pentagonal bottom face and a pentagrammic top face, or vice versa. A Heptagrammic cuploid has a heptagonal top face and a heptagrammic bottom face, or vice versa. As a further example, a cupola includes cuploidal configurations with numerous lateral faces, including configurations which approach frustoconical as the number of lateral faces increases. For example, a cupola includes an octacontagon, which has eighty lateral faces. A cupola also includes a cuploidal polyhedron, which includes a cupola or cuploid combined with another polyhedron.

A wedge includes a polyhedron with a polygonal top face and a plurality of polygonal lateral faces that converge into a line. By way of example, a wedge may include a tetrahedral wedge, an obtuse wedge, an acute wedge, and a wedged polyhedron, and combinations of these. A tetrahedral wedge has two trigonal lateral faces and two tetragonal lateral faces. The lateral faces are bisected by a tetragonal plane on one side and converge into a line on the other. An obtuse wedge converges into a line that is wider than the opposing tetragonal plane. An acute wedge converges into a line that is narrower than the opposing tetragonal plane. A wedged polyhedron includes a wedge combined with another polyhedron.

A pyramid includes a polyhedron with a polygonal base bisected by a plurality of trigonal lateral faces that converge into a point. By way of example, a pyramid includes a tetragonal pyramid composed of a tetragonal face bisected by four trigonal lateral faces which converge into a point. A pyramid also includes a star pyramid, composed of a star polygonal base and a plurality of trigonal lateral faces that converge into a point. As an example, a star pyramid includes a pentagonal star pyramid.

Any one or more of these oblique polyhedral configurations (including combinations or portions thereof) may be included in various exemplary oblique cellular structures. For example, FIGS. 5A-5G show an exemplary oblique polyhedral cellular structure 500. An oblique polyhedral cellular structure 500 includes a plurality of converging polyhedral cells 502, 212, and a plurality of diverging polyhedral cells 504, 214, bisected by a top face 506 and a bottom face 508. Typically the top face 506 and the bottom face 508 are substantially parallel to one another. Each of the converging or diverging polyhedral cells 502, 504 have a plurality of lateral polygonal faces 509. These lateral polygonal faces include at least a first lateral face 510 that converges relative to the normal line 201 and/or relative to at least a second lateral face 512. Additionally, or in the alternative, the first lateral face 510 diverges relative to normal line and/or relative to at least a third lateral face 514. These cells 502, 504 have asymmetry in respect of at least one such converging or diverging lateral face and/or in respect of a differing cross-sectional area as between the two substantially parallel planes (i.e., the top face 506 and the bottom face 508) that bisect the cell.

As discussed in more detail herein, the substantially parallel planes 506, 508 may bisect an oblique polyhedral cell as a plane, as a line, or as a point, depending on the configuration of the particular cell. As a convenience, such a plane, line, or point may sometimes be referred to more generally as a face. For example, referring to FIGS. 5A-5G, the top face 506 bisects both the converging cells 502 and the diverging cells 504 as a plane, and the bottom face 508 bisects the converging cells 502 as a line and the diverging cells 504 as a plane.

In one aspect, the converging polyhedral cells 502 shown in FIGS. 5A-5C reflect aspects of an antiprism combined with aspects of a wedge. For example, the converging polyhedral cells 502 include a polygonal (hexagonal) top face 506, and similar to an antiprism, a plurality of trigonal lateral faces bisected by a bottom face 508. Similar to a wedge, the bottom face 508 has the form of a line. In another aspect, the converging polyhedral cells 502 reflect aspects of a "flipped antiprism," that is, an antiprism that has been twisted 180-degrees about its vertical axis. As shown in FIG. 5D below, the converging polyhedral cells 502 have been flipped or twisted at their midpoints 503. The diverging polyhedral cells 504 shown in FIGS. 5A-5C reflect aspects of an antiprism combined with aspects of a frustum and/or a cupola. For example, the diverging polyhedral cells 504 include a polygonal (hexagonal) top face 506, bisected by a plurality of lateral faces, which similar to an antiprism have a plurality of adjacent trigonal lateral faces, but also with an alternating sequence of trigonal lateral faces and tetragonal lateral faces similar to a cupola.

The plurality of lateral faces that make up a given cell 502, 504 of the exemplary array are further illustrated in FIGS. 5D and 5E. FIG. 5D shows a converging polyhedral cell 502, projected onto a two-dimensional space. FIG. 5E similarly shows a two-dimensional projection of a diverging polyhedral cell 504. As further illustrated in FIG. 5D, the exemplary converging cells 502 have ten lateral faces, including a first lateral face 516, a second lateral face 518, a third lateral face 520, a fourth lateral face 522, a fifth lateral face 524, a sixth lateral face 526, a seventh lateral face 528, an eighth lateral face 530, a ninth lateral face 532, and a tenth lateral face 534. In this exemplary embodiment, the first, second, fourth through seventh, ninth, and tenth lateral faces each converge relative to the normal line 201. These lateral faces also each converge relative to all of the other lateral faces of the cell. On the other hand, the third and eighth lateral faces are substantially parallel to the normal line 201 (and to one another), and are substantially perpendicular to the top face 506 and the bottom face 508.

In one aspect, these ten lateral faces reflect a flipped antiprism, as a first portion of the lateral faces has a first sequence of adjacent alternating trigonal lateral faces 535 that mirrors a second sequence of a second portion of the lateral faces 537. In particular, the sequence of adjacent alternating trigonal lateral faces of the first through fifth lateral faces 535 mirrors the sequence of the sixth through tenth lateral faces 537. Given this flipped antiprism configuration, the lateral faces converge into a line at the bottom face 508. In this regard, the converging cells 502 also reflect aspects of a wedge, or a "flipped antiprism wedge."

As further illustrated in FIG. 5E, the exemplary diverging cells 504 also have ten lateral faces, including a first lateral face 536, a second lateral face 538, a third lateral face 540, a fourth lateral face 542, a fifth lateral face 544, a sixth lateral face 546, a seventh lateral face 548, an eighth lateral face 550, a ninth lateral face 552, and a tenth lateral face 554. In this exemplary embodiment, the first through fourth and sixth through ninth lateral faces each diverge relative to the normal line 201. These lateral faces also diverge relative to all of the other lateral faces. On the other hand, the fifth and tenth lateral faces are substantially parallel to the normal line 201 (and to one another) and are substantially perpendicular to the top face 506 and the bottom face 508. In one aspect, these ten lateral faces reflect a flipped antiprism, with the middle trigonal lateral plane exchanged for a trapezoid having an isosceles configuration similar to a lateral plane in a tetragonal frustum. In another aspect, these ten lateral faces reflect a cupola combined with a frustum, as the second and third lateral faces 538, 540 and the seventh and eighth lateral faces 548, 550 respectively converge into a plane, providing a tetragonal bottom face relative to the hexagonal top face.

Referring back to FIGS. 3D and 3E, and also to FIGS. 5F and 5G, a core layer for an acoustic liner is typically formed using an expansion process, in which strips of core material are selectively adhered to one another at a multitude of adherence regions located at selected length intervals along respective strips. The strips are then expanded apart from one another at a multitude of expansion regions respectively located between the multitude of adherence regions. FIG. 3D shows a side view of a strip of pre-expanded core material with a plurality of fold lines 305 configured to form a parallel polyhedral cellular structure. FIG. 3E shows a perspective view of a parallel polyhedral cellular structure formed by expanding a plurality of strips of core material configured as shown in FIG. 3D. FIG. 5F shows a side view of a pre-expanded strip of core material with a plurality of fold lines 507 configured to form an oblique polyhedral cellular structure. FIG. 5G shows a perspective view of an oblique polyhedral cellular structure formed by expanding and/or folding the core material.

Portions of core material may be cut from a supply such as a roll. Several of these portions may be selectively adhered to one another at a multitude of adherence regions located at selected length intervals along respective portions. The portions may be cut to provide strips which are folded and/or expanded apart from one another at a multitude of expansion regions respectively located between the multitude of adherence regions. When folded and/or expanded, the portions of core material shown in FIG. 5F form a core layer having a substantially flat planar profile, as shown in FIG. 5G. The plurality of strips of core material in their unfolded state may exhibit a substantially curvilinear configuration. For example, as shown in FIG. 5F, the portions or strips of core material exhibit a generally circular configuration, attributable to the accumulation of convergence or divergence angles of the respective lateral faces. In other embodiments, the portions or strips of core material may exhibit an elliptical configuration, a spiral configuration, a wavy or oscillating configuration, a linear configuration, or combinations of these.

Numerous additional embodiments of oblique polyhedral cellular structures or cells are within the spirit and scope of the present disclosure, any one or more of which may be provided separately from one another or in combination with one another. An exemplary oblique polyhedral cell may include one or more parallel lateral faces together with one or more converging lateral faces and/or one or more diverging lateral faces. Additionally, an exemplary oblique polyhedral cell may exhibit both converging aspects and diverging aspects, such as one or more converging lateral faces together with one or more diverging lateral faces. This may be the case in various embodiments that include aspects of an antiprism, a twisted prism, a rhombohedron, and/or an obtuse wedge. With a converging polyhedral cell, typically the top face 506 has a larger surface area than the bottom face 508. With a diverging polyhedral cell, typically the bottom face 508 has a larger surface area than the top face 506.

In some embodiments, however, the surface area of a top face 506 of an exemplary polyhedral cell may be the same as the surface area of a bottom face 508. This is possible where a cell has a combination of converging lateral faces and diverging lateral faces. For example, an oblique polyhedral cell that has aspects of an antiprism and/or aspects of a twisted prism may be provided in which the top face and the bottom face have the same surface area, while the lateral faces include a combination of converging lateral faces and diverging lateral faces. In some embodiments, oblique polyhedral cells may be combined or intermixed with parallel polyhedral cells (See, e.g. FIG. 14). In some embodiments, an oblique polyhedral cell may have a differing cross-sectional area as between the two substantially parallel planes that bisect the cell. Also, in some embodiments an oblique polyhedral cell may have an increased surface area relative to the surface area of the most geometrically similar right prism.

Dimensional and Proportional Relationships of Oblique Cellular Structures

In addition to the numerous various oblique polyhedral structures discussed above, also presently disclosed are numerous various dimensions or relative proportions for these structures. In one aspect, dimensions of oblique polyhedral cells may be modified, and in another aspect a proportional relationship between various cell configurations (e.g. between converging cells and diverging cells) in an array can be modified. In yet another aspect, different combinations of cells can be provided in an array, and the dimensions or relative proportions of the different cells in an array can be modified. Any one or more of these aspects may be selected to obtain desired acoustic damping or attenuation properties of the core layer or portions thereof.

Figure 6B:
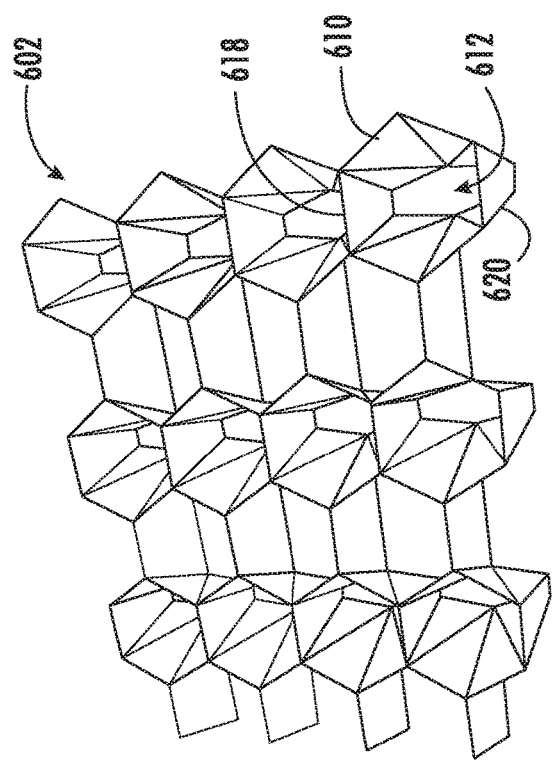
FIGS. 6A-6C show top perspective views of additional exemplary oblique polyhedral cellular structures, each with a respectively different frustum factor.
Figure 6C:
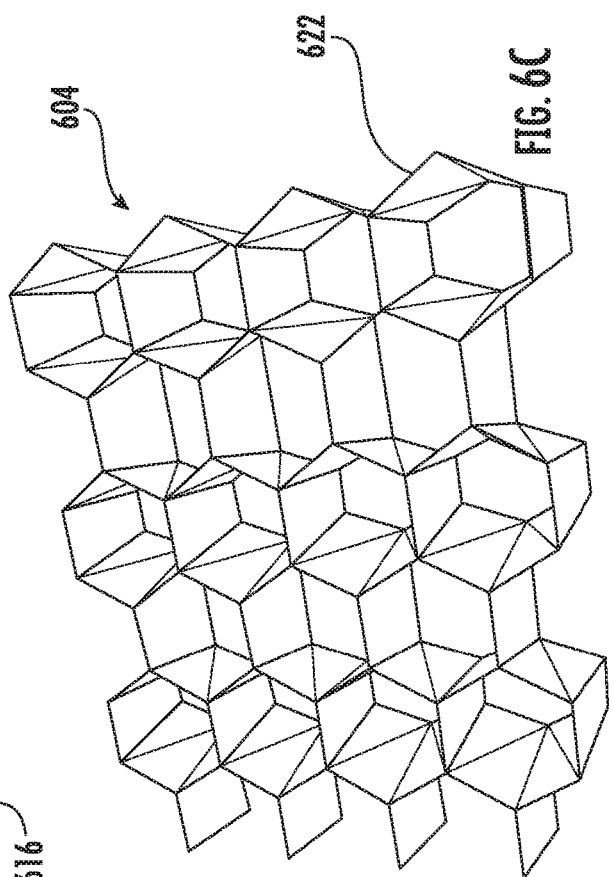
Figure 6A:
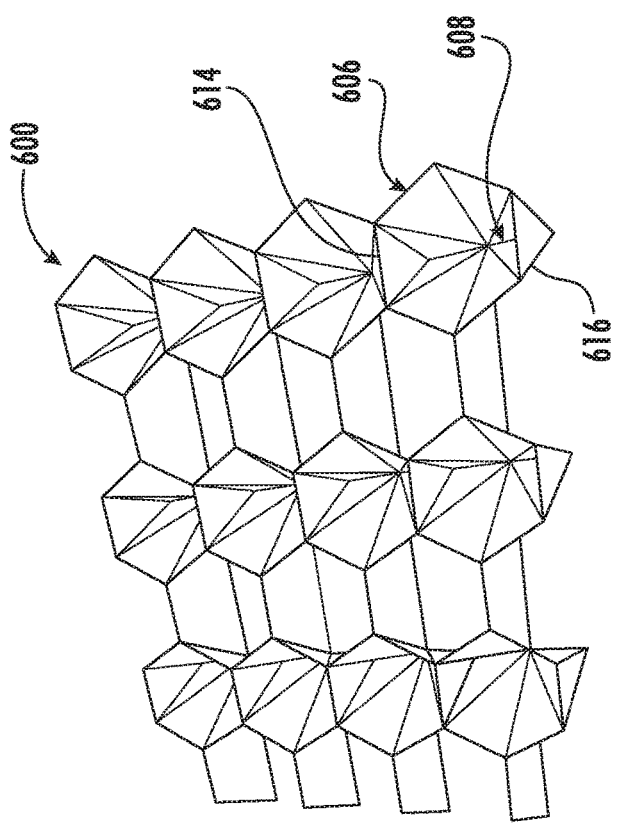

The dimensions of an oblique polyhedral cell can be described by a degree of convergence of the cell. This degree of convergence can be described by a frustum factor, $\delta$ (delta) as follows: $\delta=(P_{BF}-P_{TF})/(P_{BF}+P_{BF})$, where $P_{BF}$ is the perimeter of the bottom face and $P_{TF}$ is the perimeter of the top face. FIGS. 6A-6C show three different arrays of oblique polyhedral cells 600, 602, 604 that each have a generally similar arrangement of converging cells and diverging cells relative to one another, but with different frustum factors. A frustum factor may describe how closely an oblique polyhedral cell reflects aspects of a pyramid or wedge versus a parallel polyhedral cell. As will be appreciated, a wedge or pyramid has a frustum factor of 1.0 or −1.0 depending on its orientation. Conversely, a right prism has a frustum factor of zero. Thus, parallel polyhedral cells have a frustum factor of zero, and oblique polyhedral cells have a frustum factor ranging from greater than zero to 1.0 or less than zero to −1.0.

The array of oblique polyhedral cells 600 shown in FIG. 6A have a similar configuration as the array shown in FIGS. 5A-5G. The array 600 in FIG. 6A includes converging cells 606 that have a flipped antiprism configuration, as the lateral faces converge into a line at a bottom face 608. This configuration is similar to the configuration shown in FIG. 5A. These cells have a frustum factor of zero, which corresponds to the wedge-like aspects of the cells. The array 602 in FIG. 6B includes converging cells 610 that also have a flipped antiprism configuration, but rather than converging into a line, the lateral faces are bisected by a bottom face 612. These cells reflect aspects of a flipped antiprism; but by way of comparison, the cells in FIG. 6B have two opposing tetragonal lateral faces 618, 620 in place of the opposing trigonal lateral faces 614, 616 of the cells in FIG. 6A. The converging cells 610 in FIG. 6B therefore also reflect aspects of a frustum, or a "flipped antiprism frustum." The array of cells 604 in FIG. 6C include converging cells 622 that have a similar configuration to the converging cells 610 in FIG. 6B, but with a relatively larger frustum factor.

The converging cells 610 in FIG. 6B have a frustum factor of about −0.2 (the relative proportion of the bottom face perimeter to the top face perimeter being about 2:3). In comparison, the converging cells 622 in FIG. 6C have a frustum factor of about −0.14 (the relative proportion of the bottom face perimeter to the top face perimeter being about 3:4). While these examples address converging cells, the same comparisons may be made for diverging cells. In some embodiments, an antiprism and/or a twisted prism may have a frustum factor of 1.0. Accordingly, polyhedral cells may be configured with aspects of an antiprism and/or of a twisted prism to provide converging cells or diverging cells that have a frustum factor of 1.0.

In some embodiments, these oblique polyhedral cells may be configured to provide an increased surface area for a given volume relative to parallel polyhedral cells. Without being bound to any theory, it is believed that such an increase in surface area relative to volume improves the attenuation or damping properties of the cells relative to parallel polyhedral cells. As an example, a star cupola may have a frustum factor of greater than 1.0. This is because the perimeter of a star polygon exceeds the perimeter of a corresponding polygon. Accordingly, polyhedral cells may be configured with aspects of a star cupola to provide converging cells or diverging cells that have a frustum factor of greater than 1.0.

In addition to the degree of convergence and/or a degree of divergence described by a frustum factor discussed above, the dimensions of an oblique polyhedral cell can be described by the proportional relationship between various cell configurations in an array. This proportional relationship can be described by a facing factor, $\omega$ (omega), which describes the proportion of the facing surface area of a given region of an array occupied by converging cells relative to the facing surface, or by the proportion of the facing surface area occupied by diverging cells relative to the facing surface. This facing factor, ω (omega) is calculated as follows: $\omega=[(S_C-S_D)/S_T]\times[(S_C+S_D)/S_T]$, where $S_C$ is the proportion of the surface area in the given region of the array occupied by converging cells relative to the facing surface, $S_D$ is the proportion of the surface area in the given region of the array occupied by diverging cells relative to the facing surface, and $S_T$ is the total surface area of the given region of the array. Where a cell has both converging and diverging aspects, the facing factor can be calculated by fragmenting those cells into their respective converging and diverging portions. It will be appreciated that a facing factor will approach 1.0 as a facing surface of an array is occupied by an increasingly larger proportion of converging cells. Conversely, a facing factor will approach −1.0 as a facing surface of an array is occupied by an increasingly larger proportion of diverging cells. Additionally, it will be appreciated that a facing factor will be reduced proportionally for the portion of a given region of an array that is not occupied by converging cells or diverging cells such as a region occupied by parallel cells.

Exemplary core layers exhibiting various combinations of frustum factors and facing factors are shown in FIGS. 7A-7C, 7D-7F, and 7G-7I. For example, FIGS. 7A-7C respectively show a top perspective view, a side view, and a bottom perspective view of an exemplary cellular structure 700 with a facing factor of 0.5 on the top face 702, and a facing factor of −1.0 on the bottom face 704. The cellular structure includes converging cells 706 and diverging cells 708. The surface area of the converging cells 706 occupies about 75% of the top face 702 and about 0% of the bottom face. The surface area of the diverging cells occupies about 25% of the top face 702 and about 100% of the bottom face 704. The converging cells 706 in the core layer shown in FIGS. 7A-7C have a frustum factor of about −0.5 (the relative proportion of the bottom face perimeter to the top face perimeter being about 2:6). By comparison, the exemplary core layer shown in FIGS. 5A-5C has a facing factor of 0.0 on the top face, as the converging cells 502 and the diverging cells 504 each occupy about 50% the surface area of top face.

Figure 7H:
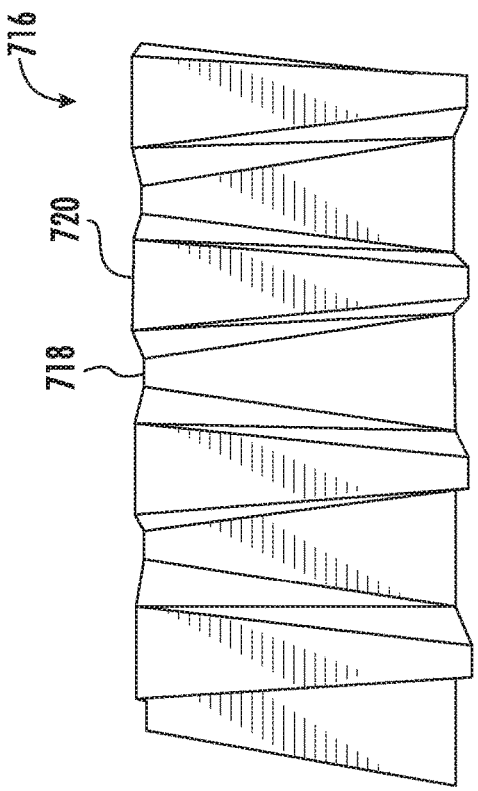
FIGS. 7G-7I respectively show a top perspective view, a side view, and a bottom perspective view of yet another exemplary oblique polyhedral cellular structure, which has an increased frustum factor for the diverging cells, providing diverging cells that substantially inversely mirror the adjacent converging cells.
Figure 7G:
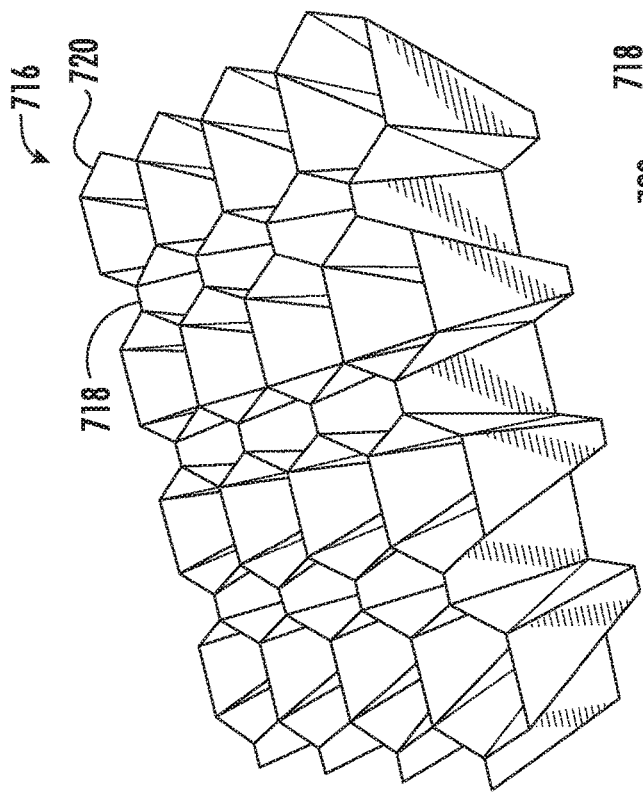
Figure 7I:
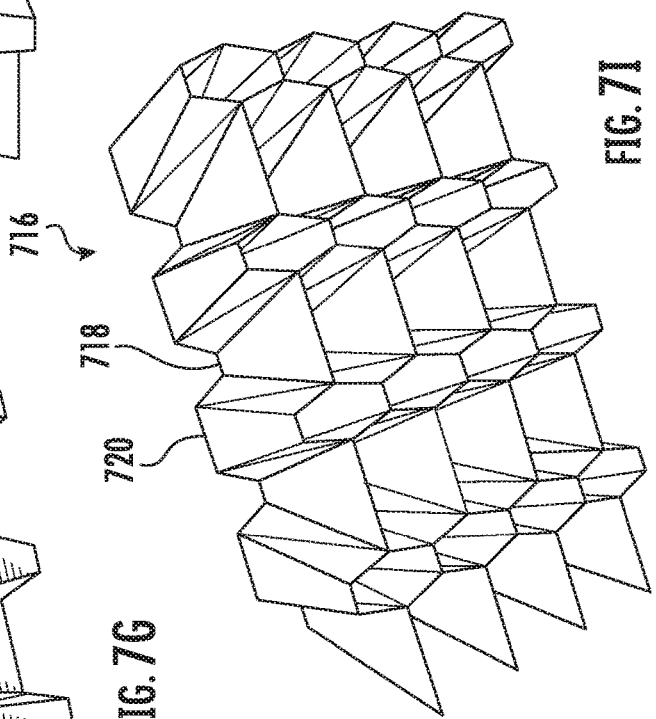

FIGS. 7D-7F respectively show a top perspective view, a side view, and a bottom perspective view of yet another exemplary cellular structure 710. In this exemplary embodiment, the facing factor of the top face 712 has been maximized for the particular orientation of the cells in FIGS. 7A-7L. By way of illustration, the facing factor was maximized in this exemplary cellular structure by increasing the frustum factor of the cells until the top face of the diverging cells 714 reduced from a hexagon to a tetragon. FIGS. 7G-7I respectively show a top perspective view, a side view, and a bottom perspective view of yet another exemplary cellular structure 716, that has an increased frustum factor for the diverging cells 718. The increased frustum factor provides diverging cells 718 that substantially inversely mirror the adjacent converging cells 720. While the frustum factors are not identical as between the diverging cells 718 and the converging cells 720, the bottom face 722 of the diverging cells 718 has been increased from a tetragon to a hexagon, for example, relative to the diverging cells in FIGS. 7A-7D. As such, the converging cells 720 and the diverging cells 718 approximately inversely mirror one another.

Accordingly, a core layer may be configured with differently shaped cells for use in different acoustic environments. In some embodiments, an acoustic liner may be provided with a core layer that includes an array of oblique polyhedral cells with a plurality of different cell configurations. For example, in some embodiments a core layer may include an array of cells that exhibits a plurality of different frustum factors and/or facing factors as between various portions of the array. In some embodiments, a frustum factor and/or a facing factor may vary translationally in one or more directions across an array of cells. As discussed above with respect to FIGS. 5F and 5G, strips of core material may be provided that exhibit a generally circular configuration, which when folded and/or expanded provide a generally flat planar profile. Similarly, FIGS. 8A and 8B show additional exemplary strips of core material 800, 802, each with a plurality of fold lines 801, 803, which may be folded or expanded to provide a generally flat planar profile. These strips 800, 802, however, are configured to provide a frustum factor and/or a facing factor that varies translationally across the array of cells. As such, the strips exhibit a spiral configuration which corresponds to the varying frustum factor and/or facing factor. FIG. 8C shows an array of oblique polyhedral cells 802 formed from a plurality of the strips of core material shown in FIG. 8B. In some embodiments, the array shown in FIG. 8C may exhibit a first frustum factor at a first region 804 of the array, and a second frustum factor at a second region 806 of the array. Additionally or in the alternative, the array shown in FIG. 8C may exhibit a first facing factor at a first region 804 of the array, and a second facing factor at a second region 806 of the array. Likewise, in some embodiments strips of core material may exhibit a wavy or oscillating configuration or a combination of configuration. Strips with these kinds of configurations may, when folded or expanded, provide an array of cells with a generally flat planer profile. This may be accomplished by coordinating the configuration of the strips of core material with the desired planar configuration obtained by folding and/or expanding the strips.

Conversely, in some embodiments, curvilinear planar arrays of core material may be provided by coordinating the configuration of the strips of core material with the desired curvilinear planar profile. For example, a curvilinear planar array of cells may be provided from substantially linear strips of core material that are configured to be folded or expanded to provide oblique polyhedral cells. In some embodiments, oblique polyhedral cells such as those shown in FIG. 5D, 8A, or 8B may be provided from substantially linear strips of core material. When folded or expanded, these exemplary linear strips would respectively provide arrays of cells with a curvilinear planar profile substantially corresponding to the profile of the curvilinear strips of core material shown in FIG. 5D, 8A, or 8B. Curvilinear arrays such as these may be useful for providing acoustic liners that have curvilinear profiles such as shown in FIG. 2B. A curvilinear planar profile may be selected that corresponds to a curved surface where the acoustic liner will be installed, such as a profile of a nacelle 102 as shown in FIG. 1. Additionally, in some embodiments, an array of cells may be provided that exhibits both a curvilinear profile together with a frustum factor and/or a facing factor that varies translationally across the array of cells. In this manner, an array of cells may be provided that includes different cell configurations to address varying acoustic environments where an acoustic liner containing the array will be installed, as well as a curvilinear planar profile that corresponds to a curved surface where the acoustic liner will be installed.

Configurations of Core Material Strips and Corresponding Cellular Structures

It will be appreciated that in some embodiments it may be advantageous to avoid waste or unused material when cutting strips of core material from a larger supply of core material. In some embodiments, strips of core material having a circular, spiral, or curvilinear configuration may result in waste or unused material. However, in some embodiments strips of core material can be cut from a larger supply of core material such as a roll to provide oblique polyhedral cellular structures that reduce waste material.

Wavy Strips and Oblique Cells Formed Therefrom

For example, in some embodiments oblique polyhedral cells may be cut from wavy or oscillating strips of core material configured such that the respective edges of subsequently cut strips align with one another (e.g. FIGS. 9A-9E, and 10A-10D). Additionally, in some embodiments oblique polyhedral cells may be cut from linear strips of core material (e.g., FIGS. 11A-11C, 12A-12C, and 13A-13D). In various embodiments, adjacent cells of an array or cellular structure may abut with one another at their respective adjacent lateral edges, corners, face edges, and/or lateral faces, as shown in FIGS. 9A-9E, 10A-10D, 11A-11C, 12A-12C, and 13A-13D. The strips of core material may be configured to provide such adjacent and abutting lateral edges, corners, face edges, lateral faces, or combinations thereof.

FIGS. 9A-9C show an exemplary embodiment utilizing wavy or oscillating strips of core material to provide an array of oblique polyhedral cells with adjacent and abutting lateral edges and corners. FIG. 9A shows an exemplary pre-expanded strip of core material 900 with a plurality of fold lines 901. Several of these strips may be selectively adhered to one another, and then folded and/or expanded to form the array of oblique polyhedral cells as shown in FIGS. 9B and 9C. The array of cells shown in FIGS. 9B and 9C includes converging cells 902 and diverging cells 904 which are adjacent to and abutting one another at sides of the cells. Additionally, the array includes bowtie shaped cells 906, 908 which are adjacent to and abutting converging cells and diverging cells at corners and lateral edges. These bowtie shaped cells include both converging and diverging aspects.

Figure 9D:
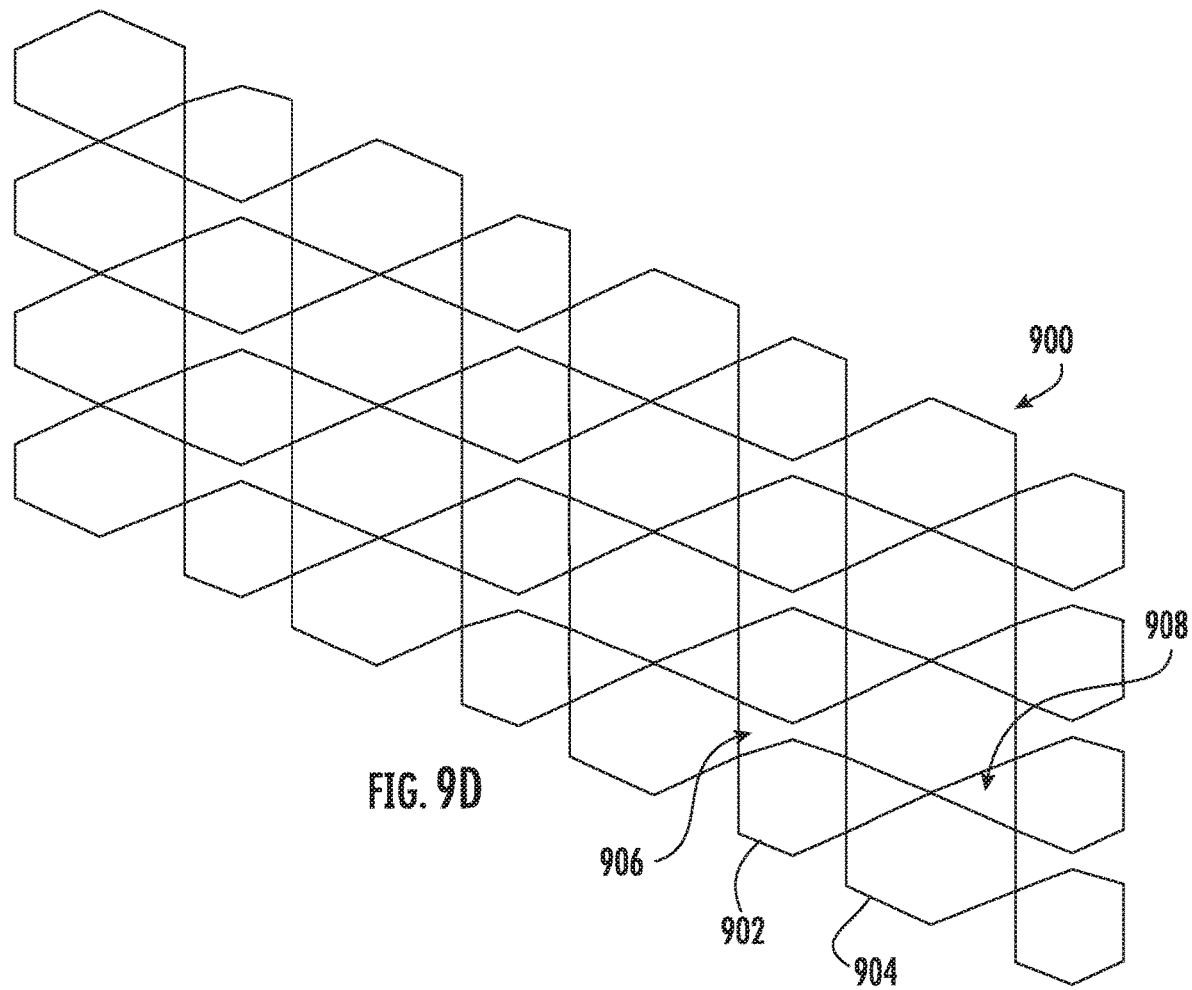
FIG. 9D shows a cross-sectional view of the exemplary oblique polyhedral cellular structure formed by folding and/or expanding the core material of FIG. 9A.
Figure 9E:
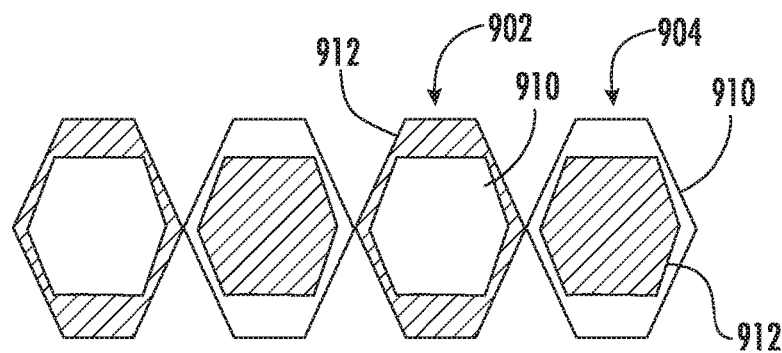
FIG. 9E shows cross-sectional views of the top face and the bottom face of the exemplary oblique polyhedral cellular structure of FIG. 9D translated onto one another.

FIG. 9D provides a cross-sectional view of the array shown in FIGS. 9B and 9C, which further illustrates the bowtie shaped cells, as well as the orientation of the various cells relative to one another. The cross-section may reflect the bottom face 910 or the top face 912 of the cells. FIG. 9E shows a cross-sectional view of the top face 912 translated onto a cross-sectional view of the bottom face 910.

Figure 10A:
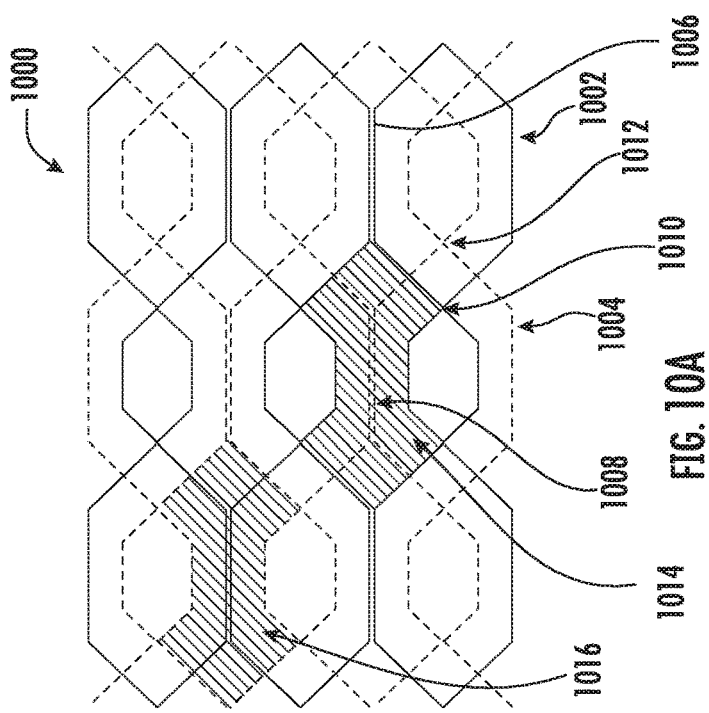
FIG. 10A shows a cross-sectional view of the top face and the bottom face of yet another exemplary oblique polyhedral cellular structure translated onto one another.
Figure 10B:
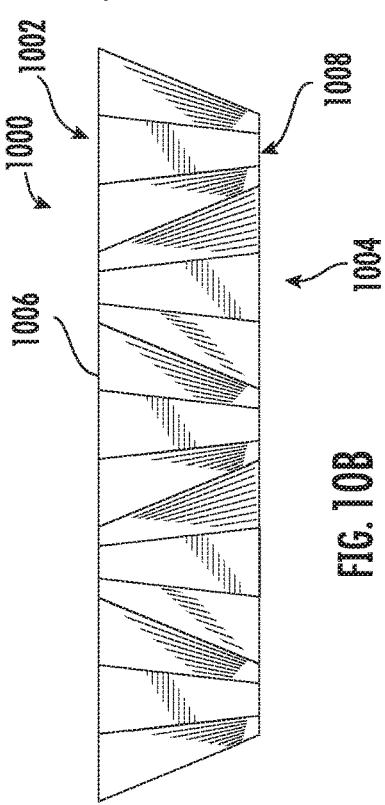
FIG. 10B shows a side view of the exemplary oblique polyhedral cellular structure shown in FIG. 10A.

FIGS. 10A and 10B show an exemplary embodiment utilizing wavy or oscillating strips of core material to provide an array of oblique polyhedral cells with adjacent and abutting lateral edges and face edges. FIG. 10A shows a cross-sectional view of an exemplary array of oblique polyhedral cells 1000. The cross-sectional view shows the top face of the cells (solid lines) translated onto the bottom face of the cells (dashed lines). FIG. 10B shows a side view of the exemplary array 1000 shown in FIG. 10A. The array includes a plurality of converging cells 1002 and a plurality of diverging cells 1004. The converging cells 1002 have adjacent lateral faces abutting one another at a lateral top face edge 1006. The diverging cells 1004 have adjacent lateral edges abutting one another at a lateral bottom face edge 1008. The converging cells 1002 abut with the diverging cells 1004 at adjacent side edges spanning from the top face 1010 to the bottom face 1012. The array shown in FIGS. 10A and 10B further includes bowtie shaped cells 1014, 1016, which have both converging and diverging aspects. The bowtie shaped cells 1014, 1016 have a top edge that corresponds to the adjacent abutting lateral edges 1006, 1008 of the diverging cells and converging cells. Bowtie shaped cells 1014 that share a top edge with the adjacent abutting lateral edges 1008 of the diverging cells may be described as converging bowtie shaped cells because they are located inversely to diverging cells 1004. Likewise, bowtie shaped cells 1016 that share a top edge with the adjacent abutting lateral edges 1006 of the converging cells may be described as diverging bowtie shaped cells because they are located inversely to converging cells 1002.

Figure 10C:
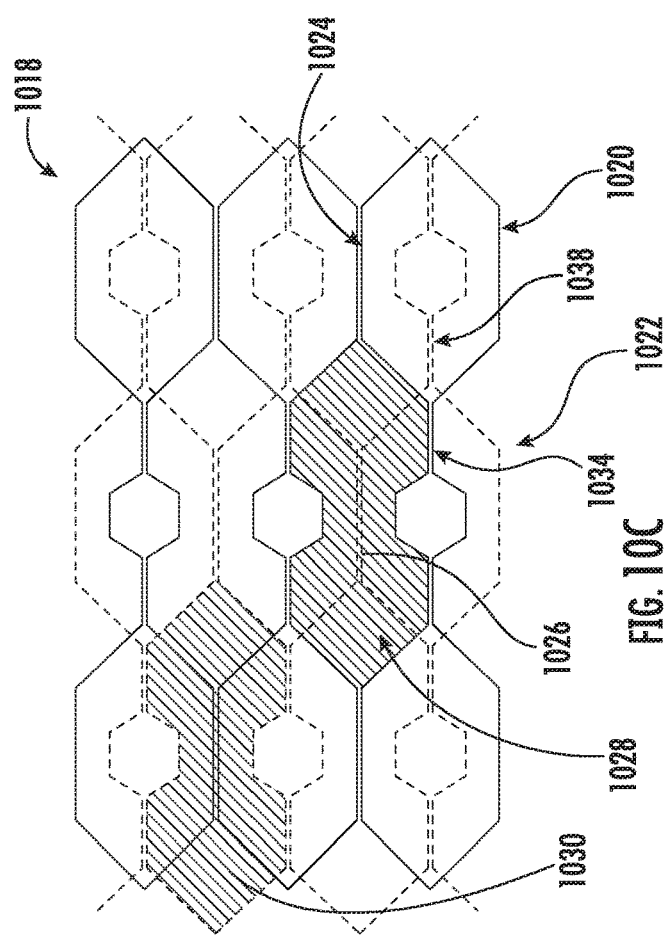
FIG. 10C shows a cross-sectional view of the top face and the bottom face of yet another exemplary oblique polyhedral cellular structure translated onto one another.
Figure 10D:
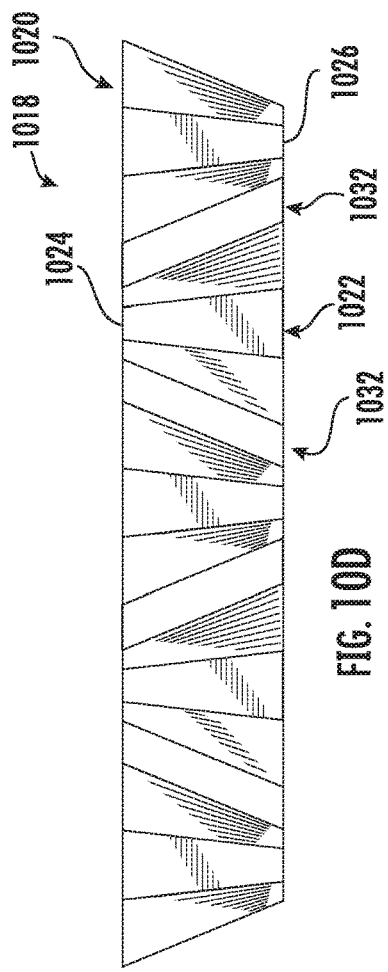
FIG. 10D shows a side view of the exemplary oblique polyhedral cellular structure shown in FIG. 10C.

In addition to the array of cells with adjacent lateral edges such as the cells shown in FIGS. 10A and 10B, an array of cells also may be formed from wavy or oscillating strips of core material to provide adjacent and abutting lateral faces, for example, as shown in FIGS. 10C and 10D. FIG. 10C shows a cross-sectional view of an exemplary array of oblique polyhedral cells 1018. The cross-sectional view shows the top face of the cells (solid lines) translated onto the bottom face of the cells (dashed lines). FIG. 10D shows a side view of the array of cells shown in FIG. 10C. The array includes a plurality of converging cells 1020 and a plurality of diverging cells 1022. As with the array of cells shown in FIGS. 10A and 10B, the array shown in FIGS. 10C and 10D similarly have converging cells 1020 with adjacent lateral faces abutting one another at a lateral top edge 1024, and diverging cells 1022 with adjacent lateral edges abutting one another at a lateral bottom edge 1026. The array shown in FIGS. 10C and 10D also similarly includes bowtie shaped cells, 1028, 1030. The converging bowtie shaped cells 1028 have a top edge that corresponds to the adjacent abutting lateral edges 1026 of the diverging cells. The diverging bowtie shaped cells 1030 similarly have a top edge that corresponds to the adjacent abutting lateral edges 1024 of the converging cells. However, in contrast with the bowtie shaped cells in FIGS. 10A and 10B, the bowtie shaped cells in FIGS. 10C and 10D have adjacent and abutting lateral faces 1032 located between adjacent spanning from the top face 1034 to the bottom face 1036. These adjacent and abutting lateral faces 1032 are located between neighboring converging cells 1020 and diverging cells 1022.

Linear Strips and Oblique Cells Formed Therefrom

Figure 11A:
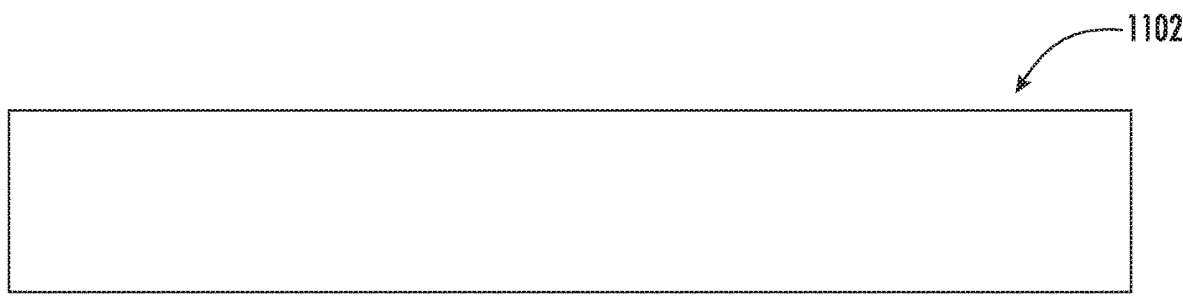
FIGS. 11A and 11B show a plurality of differently configured linear strips of core material that may be used to form an exemplary oblique polyhedral cellular structure.
Figure 11B:
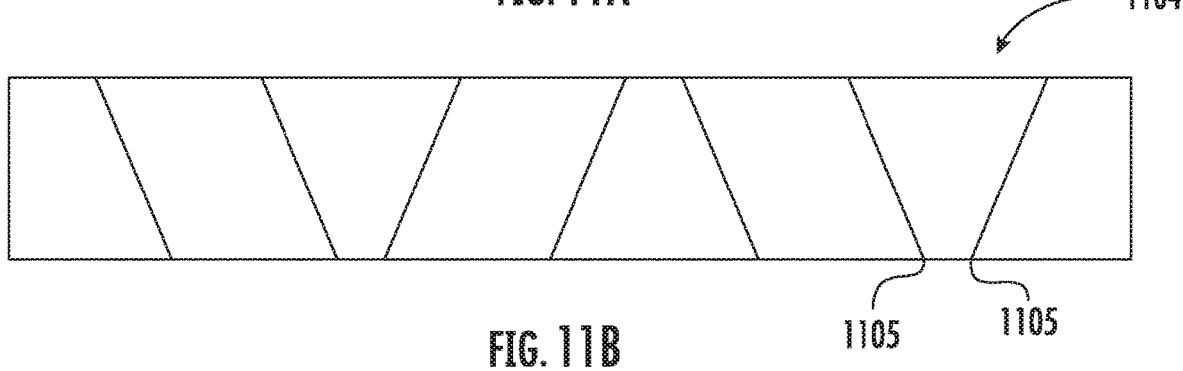
Figure 11C:
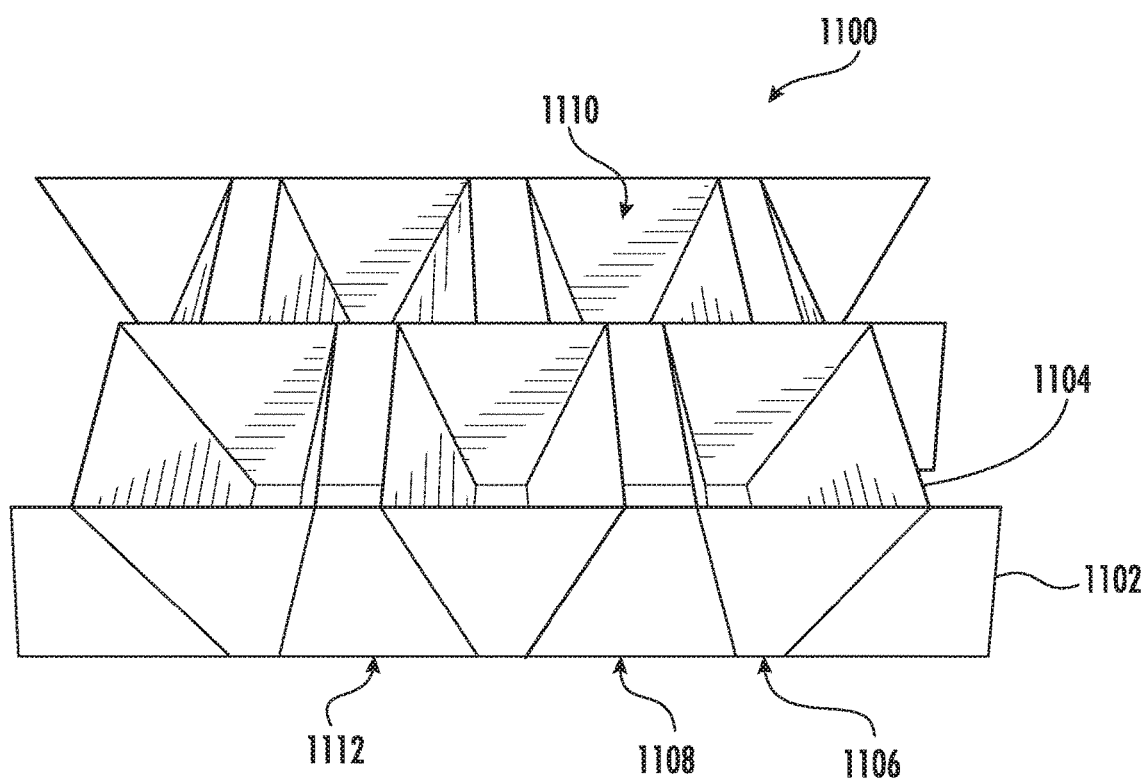
FIG. 11C shows the exemplary oblique polyhedral cellular structure formed using the plurality of differently configured strips of core material shown in FIGS. 11A and 11B.

In some embodiments, a core layer may be formed from linear strips of core material, as shown in FIGS. 11A-11C, 12A-12C, and 13A-13D. Referring to FIGS. 11A-11C, in some embodiments a core layer may be formed from a plurality of linear strips of core material that have different configurations. Differently configured linear strips of core material may be combined together to form an array of oblique polyhedral cells 1100. FIGS. 11A and 11B respectively show a first linear strip of core material 1102 and a second linear strip of core material 1104 which may be used together to form the exemplary array 1100 shown in FIG. 11C. The first linear strip of core material 1102 has a linear configuration without fold lines, and the second linear strip of core material 1104 has a linear configuration with a plurality of fold lines 1105. The array 1100 formed from the plurality of differently configured linear strips 1102, 1104 includes converging cells 1106 and diverging cells 1108. As shown in FIG. 11C, the cells are bisected by a top face 1110 and a bottom face 1112. It will be appreciated, however, that cells could be extended until the lateral faces converge into a line. Such lateral faces converging into a line would correspond to a facing factor of 1.0 for the converging cells, and a facing factor of −1.0 for the diverging cells. Both the converging cells and the diverging cells reflect aspects of a tetragonal frustum and aspects of a tetrahedral wedge. In other embodiments, cells having any other configuration may be formed using a plurality of different strips of core material in accordance with the present disclosure. For example, cells having aspects of a frustum, an antiprism, a twisted prism, a cupola, a wedge, a pyramid, a rhombohedron and combinations of these may be formed from a plurality of different strips of core material.

Figure 12A:
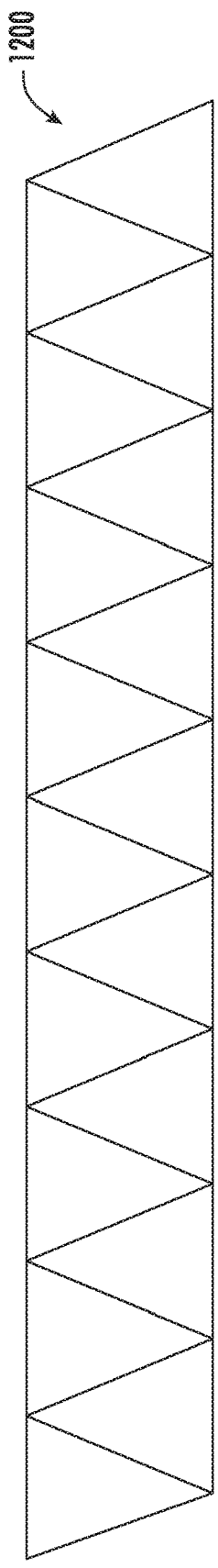
FIG. 12A shows an exemplary linear strip of core material, several of which may be combined and then folded and/or expanded to form an exemplary array of oblique polyhedral cells that have adjacent and abutting lateral faces.
Figure 12C:
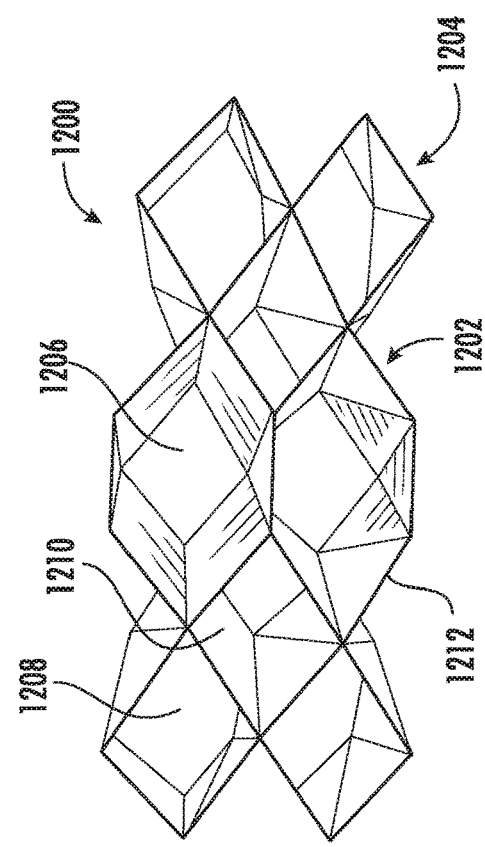
FIGS. 12B and 12C respectively show a perspective view and a top view of an exemplary array of oblique polyhedral cells formed using the strip of core material shown in FIG. 12A.
Figure 12B:
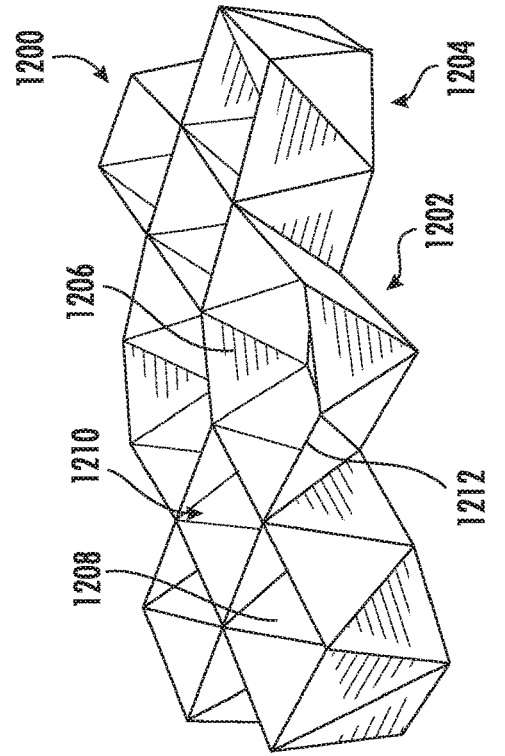

Now turning to FIGS. 12A-12C, in some embodiments, an array of oblique polyhedral cells may be formed from several linear strip of core material that have a common configuration. In some embodiments, the array may include converging cells with one or more lateral faces respectively adjacent to and abutting corresponding lateral faces of diverging cells. As an example, FIG. 12A shows an exemplary linear strip of core material 1200 with a plurality of fold lines 1201. A plurality of these linear strips of core material 1200 may be combined to form an exemplary array of oblique polyhedral cells. As shown in FIGS. 12A and 12B, an exemplary array of cells formed from the core material 1200 shown in FIG. 12A includes converging cells 1202 and diverging cells 1204. These cells inversely mirror one another, or, in other words, the converging cells 1202 reflect the diverging cells 1204 turned upside down, and vice versa. The array includes converging cells 1202 that have adjacent and abutting lateral faces 1206, and diverging cells 1204 that have adjacent and abutting lateral faces 1208. The array additionally includes substantially rhombohedral cells 1210 positioned between each pair of converging cells and diverging cells. These converging cells 1202 and diverging cells 1204 exhibit aspects of an antiprism combined with aspects of a frustum. For example, in one aspect these cells include a plurality of adjacent trigonal lateral faces of an antiprism together with converging or diverging aspects of a frustum. In another aspect, cells like these reflect aspects of a "frustal polyhedron" or a "frustal antiprism."

Figure 13A:
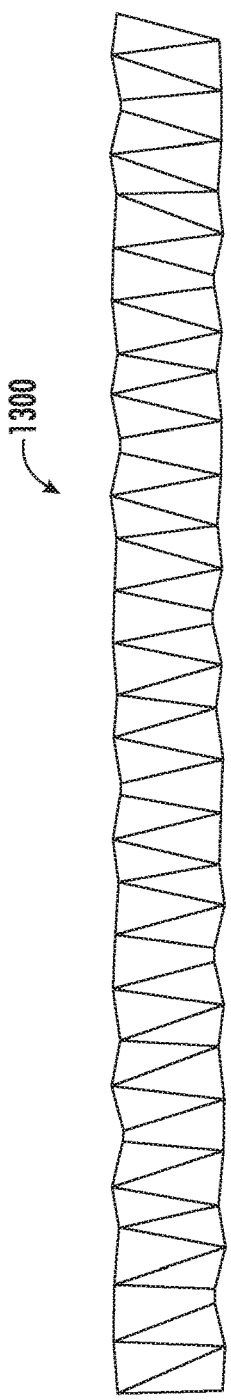
FIG. 13A shows another exemplary strip of core material, several of which may be combined and then folded and/or expanded to form another exemplary array of oblique polyhedral cells that have adjacent and abutting lateral faces.
Figure 13C:
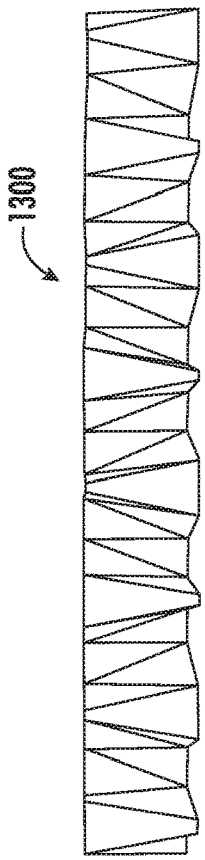
FIGS. 13B-13D respectively show a top perspective view, a side view, and a bottom perspective view of another exemplary array of oblique polyhedral cells formed using the strip of core material shown in FIG. 13A.
Figure 13D:
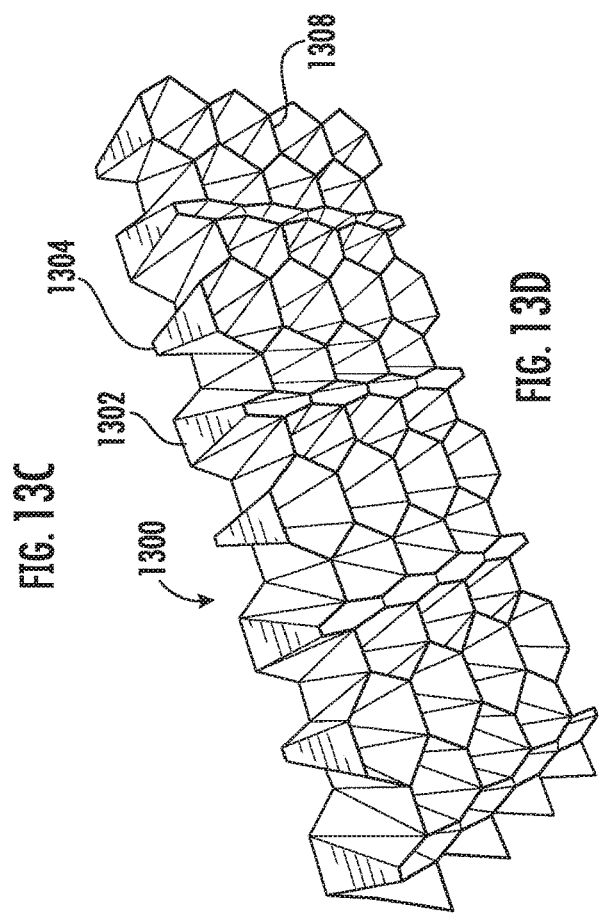
Figure 13B:
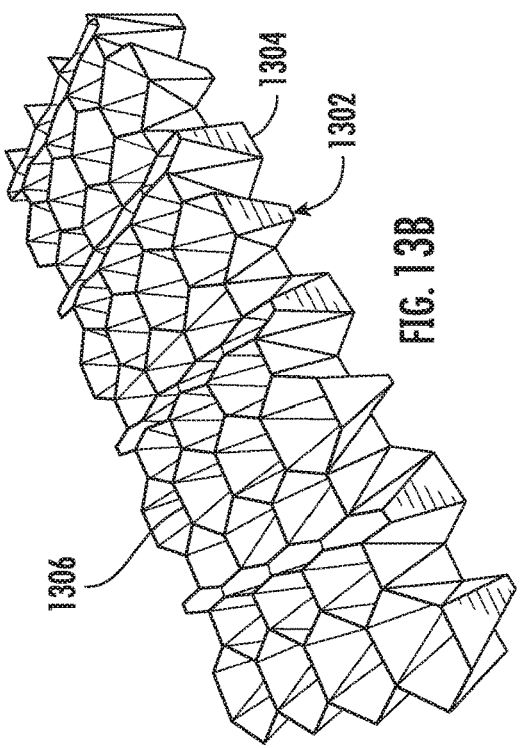

FIGS. 13A-13D show another exemplary array of oblique polyhedral cells formed from commonly configured linear strips of core material 1300. The array has alternating converging cells 1302 and diverging cells 1304 that have adjacent and abutting lateral faces. The converging cells 1302 have adjacent and abutting lateral faces 1306 (FIG. 13B), and the diverging cells 1304 have adjacent and abutting lateral faces 1308 (FIG. 13D). In one aspect, these cells include aspects of a plurality of adjacent trigonal lateral faces of an antiprism together with converging or diverging aspects of a frustum. In another aspect, cells like these reflect aspects of a "frustal polyhedron" or a "frustal antiprism."

Figure 14:
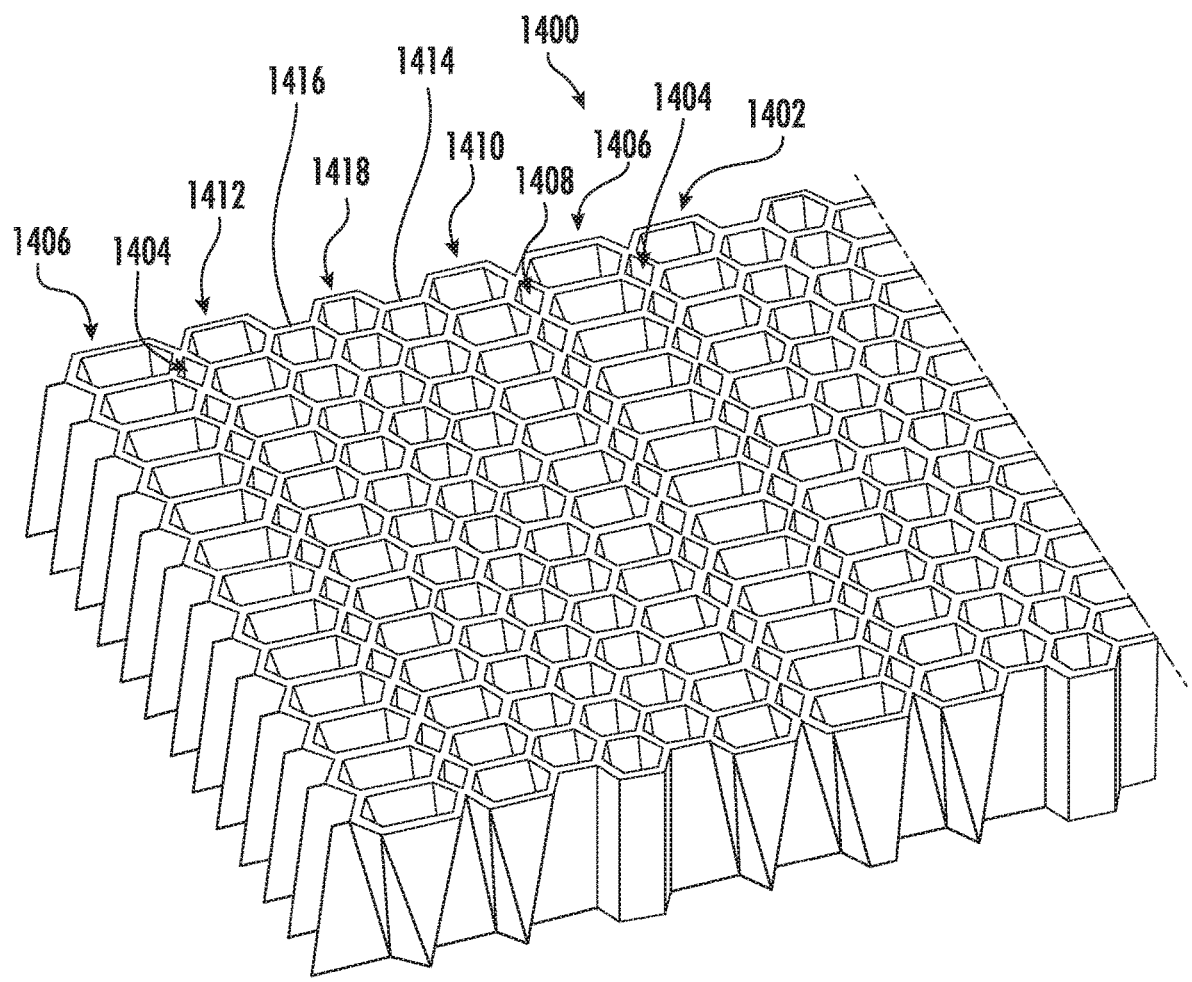
FIG. 14 shows a perspective view of an exemplary core material that has a combination of parallel and oblique polyhedral cellular structures.

The present disclosure provides numerous configurations for cellular structures that may be included in a core layer. It will be appreciated that numerous additional configurations are within the spirit and scope of the present disclosure. In some embodiments, an array of polyhedral cells may include a combination of differently configured cells. The combination may include both oblique polyhedral cells and parallel polyhedral cells, and various different configurations of these. For example, FIG. 14 shows a perspective view of an exemplary core material 1400 that has a combination of differently configured cells. This core material includes converging polyhedral cells 1402 having a first configuration, and diverging polyhedral cells 1404 having a first configuration. The core material further includes converging polyhedral cells 1406 having a second configuration, and diverging polyhedral cells 1408 having a second configuration. As shown in FIG. 14, in some embodiments a core material may further include converging polyhedral cells 1410 having a third configuration, and in some embodiments may even include further converging polyhedral cells 1412 having a fourth configuration. Similarly, a core material may further include diverging polyhedral cells 1414 having a third configuration, and in some embodiments may even include further diverging polyhedral cells 1416 having a fourth configuration. In some embodiments, a core material also may include parallel polyhedral cells 1418. The parallel polyhedral cells may be combined with oblique polyhedral cells in any desired configuration. For example, as shown in FIG. 14, the parallel polyhedral cells may be adjacent to converging cells 1414, 1416. Alternatively, or in addition, parallel polyhedral cells may be adjacent to diverging cells.

Fabrication Methods

The present disclosure additionally embraces methods of forming acoustic liners and oblique polyhedral cellular structures. Additionally, the present disclosure embraces methods of attenuating noise from a source generating a sound wave stream that may be performed using the acoustic liners and oblique polyhedral cellular structures described herein.

Figure 15A:
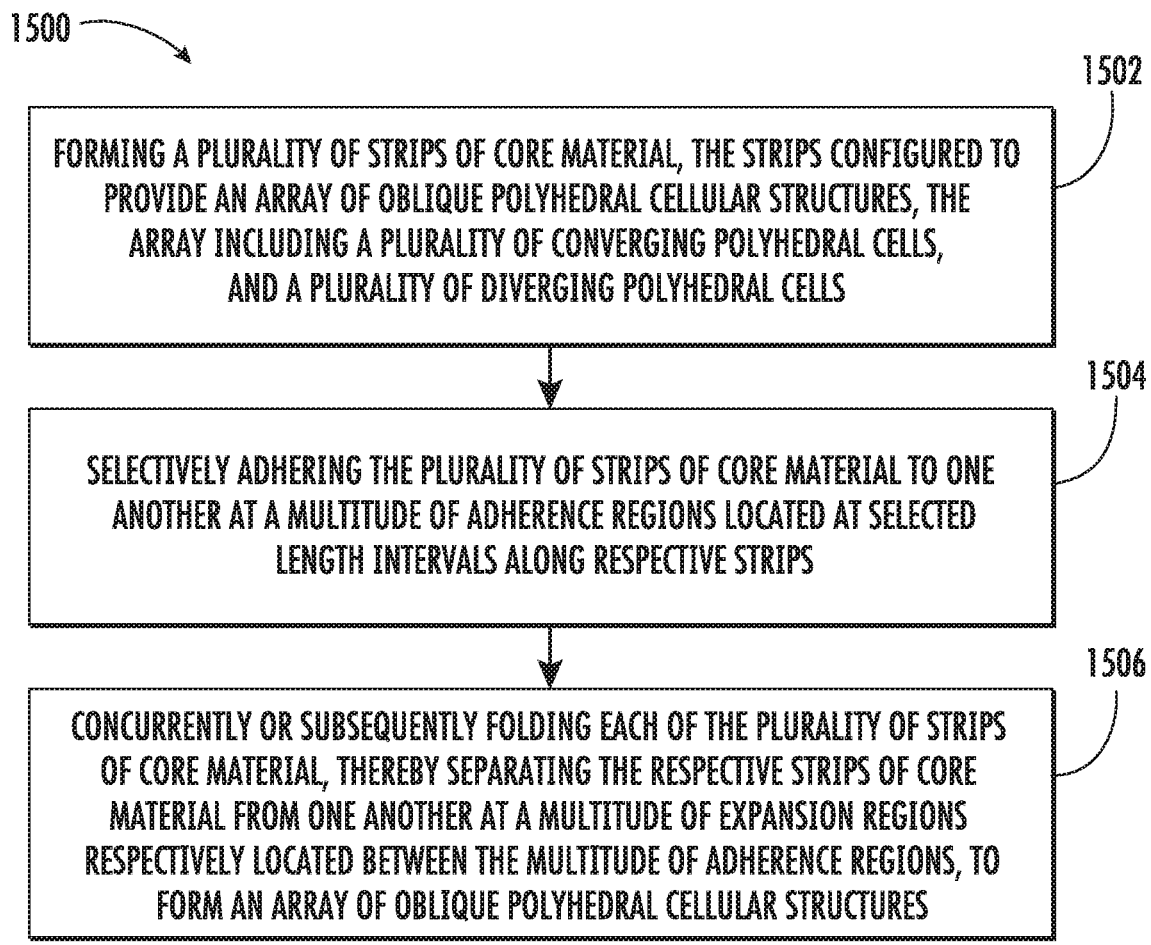
FIG. 15A shows a flow chart of an exemplary method of forming a core layer for an acoustic liner that has an oblique polyhedral cellular structure.

FIG. 15A shows a flow chart of an exemplary method 1500 of forming a core layer that has an oblique polyhedral cellular structure. The method 1500 commences with forming a plurality of strips of core material 1502 and selectively adhering the plurality of strips of core material to one another 1504. The plurality of strips may be selectively adhered to one another at a multitude of adherence regions located at selected length intervals along respective strips. The method 1500 continues with concurrently or subsequently folding each of the plurality of strips of core material 1506. The respective strips of core material are thereby separated from one another or expanded at a multitude of expansion regions respectively located between the multitude of adherence regions, providing an array of oblique polyhedral cellular structures. As an example, the strips may be configured in accordance with the present disclosure to provide an array that includes a plurality of converging polyhedral cells, and a plurality of diverging polyhedral cells.

Figure 15B:
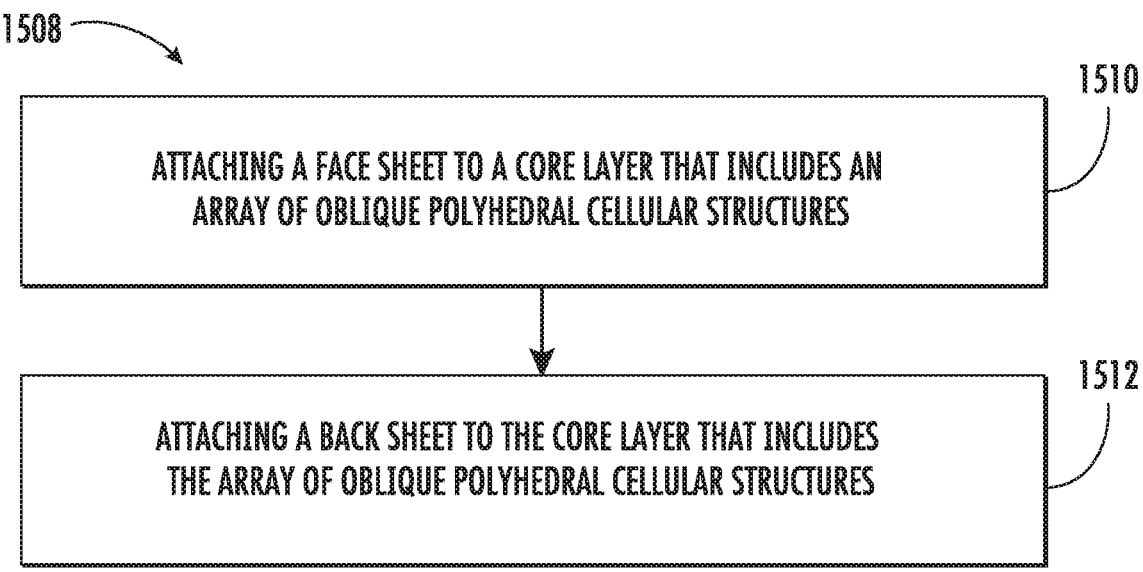
FIG. 15B shows a flow chart of an exemplary method of forming an acoustic liner using the core layer of FIG. 15A.

FIG. 15B shows a flow chart of an exemplary method 1508 of forming an acoustic liner using the core layer of FIG. 15A. The method 1508 includes attaching a face sheet to a core layer that includes an array of oblique polyhedral cellular structures 1510, and attaching a back sheet to the core layer that includes the array of oblique polyhedral cellular structures 1512. As an example, the array include a plurality of converging polyhedral cells, and a plurality of diverging polyhedral cells.

Figure 16:
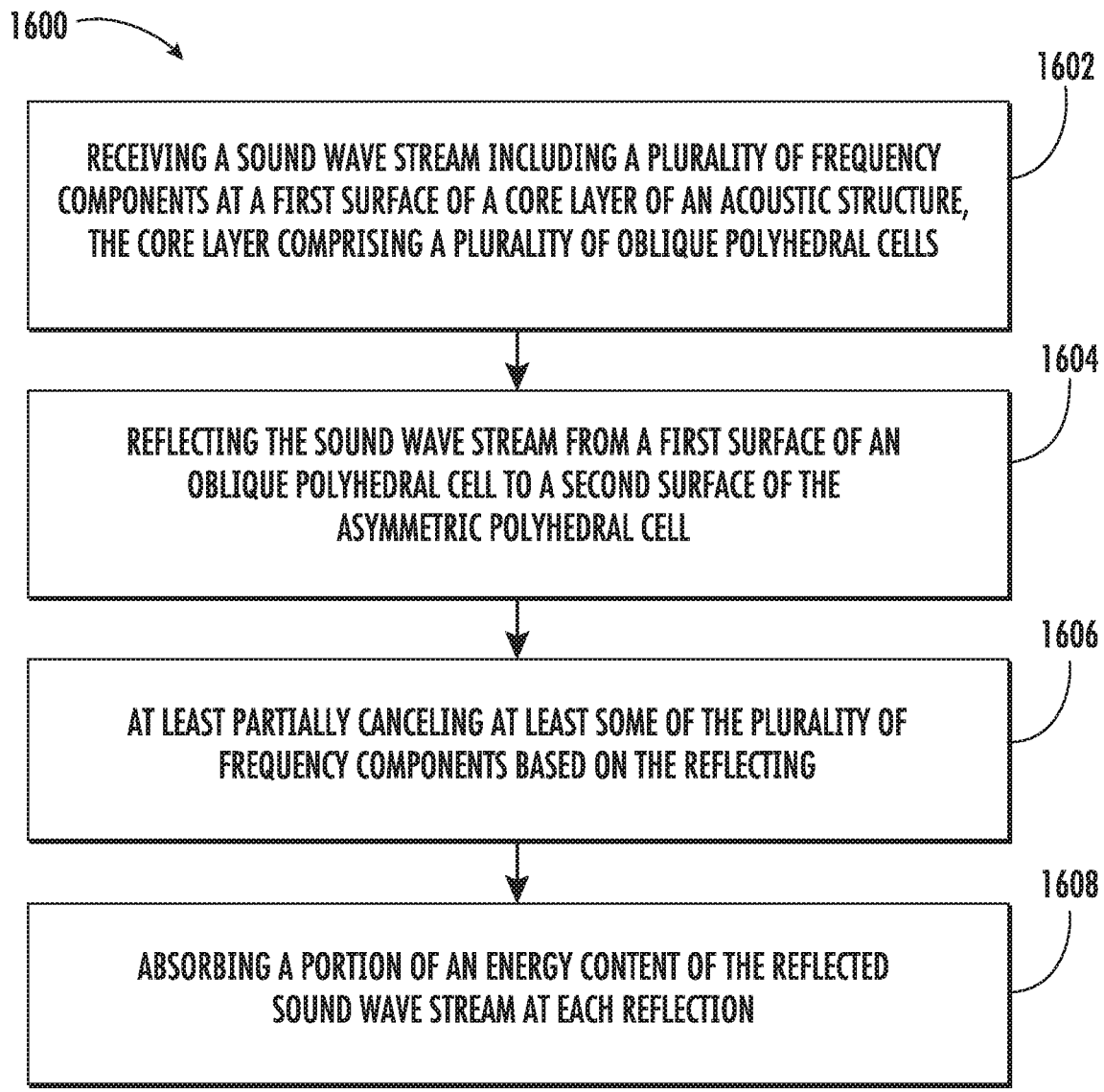
FIG. 16 shows a flow chart of an exemplary method of attenuating noise from a source generating a sound wave stream that may be performed using the acoustic liners and oblique polyhedral cellular structures of the present disclosure.

FIG. 16 shows a flow chart of an exemplary method 1600 of attenuating noise from a source generating a sound wave stream that may be performed using the acoustic liners and oblique polyhedral cellular structures of the present disclosure. The method 1600 commences with receiving a sound wave stream including a plurality of frequency components at a first surface of a core layer of an acoustic structure 1602. The acoustic structure may be a core layer and/or an acoustic liner formed in accordance with the method of FIGS. 15A and/or 15B. In some embodiments, the acoustic structure may be the core layer formed in accordance with the method of FIG. 15A. The method continues with reflecting the sound wave stream from a first surface of an oblique polyhedral cell to a second surface of the oblique polyhedral cell 1604 and at least partially canceling at least some of the plurality of frequency components based on the reflecting 1606. The method results in absorbing a portion of an energy content of the reflected sound wave stream at each reflection 1608.

OTHER EMBODIMENTS

It is understood from the foregoing description and associated figures that the shapes and configurations of the oblique polyhedral cellular structures are presented by way of example, and not in a limiting sense. Other sound wave absorptive properties and acoustic operational characteristics may be achieved using further variations of the core materials and acoustic liner including, without limitation, positioning of a second, third, and/or fourth layer of core material that has oblique polyhedral cells in relation to a first layer of core material. Such other embodiments utilized for core layers of acoustic liners and acoustic structures not having face sheets and back sheets still fall within the scope of the present disclosure for realizing acoustic suppression of greater numbers of frequencies relative to parallel acoustic structures with single degree of freedom (SDOF) and two degree of freedom (2DOF) core layers. Further, the above-described structures, systems and methods are not limited to the specific embodiments described herein, but rather, components of systems or steps of the methods may be utilized independently and separately from other components or steps described herein. For example, the acoustic structures having the above-described core layers may also be used in applications in addition to turbine engines, such as in vehicles, other engines, and in any number of other environments where the presently disclosed acoustic structures may be desirable for noise suppression (e.g., noise attenuation and damping). Additionally, the presently disclosed acoustic structures may be used in combination with any number of other sound wave absorption systems and methods.

Additionally, it should be understood that while typically the cellular structures disclosed herein are hollow, in some embodiments a foam material may be used within or surrounding the cellular structures of a core layer in an acoustic liner. Such foam material may facilitate the acoustic performance of the acoustic liner and or the structural strength of the acoustic liner.

It is understood that the terms "top" and "bottom" and the like are used herein for convenience, and that the acoustic structures described herein may be positioned in any orientation or configuration, including a backwards, opposite, or upside-down orientation or configuration.

While folding or expansion techniques may be particularly suitable for forming acoustic structures described herein, it is understood that any process or technique may be used to form these structures, including but not limited to a unitary additive manufacturing process. Such an "additive manufacturing" process includes any process which results in a three-dimensional (3D) object and includes a step of sequentially forming the shape of the object one layer at a time. Additive manufacturing processes include, for example, 3D printing, laser-net-shape manufacturing, direct laser sintering, direct laser melting, selective laser sintering (SLS), plasma transferred arc, freeform fabrication, stereolithography (SLA), and the like. Additive manufacturing processes can employ liquid materials, solid materials, powder materials, or wire as a raw material. Moreover, additive manufacturing processes can generally relate to a rapid way to manufacture an object (article, component, part, product, etc.) where a plurality of thin unit layers are sequentially formed to produce the object. For example, layers of a liquid material may be provided (e.g., laid down) and irradiated with an energy beam (e.g., laser beam) so that each layer are sequentially cured to solidify the layer. Additionally, the acoustic structures described herein may be formed using other processes, such as, but not limited to, casting or injection molding or electroforming, or coldspray.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, the terms "first," "second," "third," and the like may be used interchangeably to distinguish one aspect or feature from another. Such terms are not intended to signify location or importance of the respective aspects or features.

The various aspects, features, and embodiments disclosed herein illustratively describe exemplary embodiments and are not intended to be limiting. Other aspects, features, and embodiments will be apparent to those skilled in the art. It is intended that the scope of the present invention be defined by the following claims and their equivalents:

What is claimed is:
1. An acoustic liner comprising:
a core layer comprising a plurality of strips of core material folded to form an array of oblique polyhedral cellular structures, the array of oblique polyhedral cellular structures comprising:
a plurality of converging polyhedral cells; and
a plurality of diverging polyhedral cells;
wherein at least some of the plurality of converging polyhedral cells are bisected by a polygonal bottom face and/or at least some of the plurality of diverging polyhedral cells bisected by a polygonal top face; and
wherein the array of oblique polyhedral cellular structures comprises hollow cellular structures.

2. The acoustic liner of claim 1, further comprising:
a face sheet; and
a back sheet, wherein the core layer is positioned between the face sheet and the back sheet.

3. The acoustic liner of claim 1, wherein the array of oblique polyhedral cellular structures comprises oblique polyhedral cellular structures combined with parallel polyhedral cellular structures, the parallel polyhedral cellular structures comprising a right prism.

4. The acoustic liner of claim 1, wherein at least some of the converging polyhedral cells and/or at least some of the diverging polyhedral cells comprise a pyramid or wedge.

5. The acoustic liner of claim 1, wherein at least some of the converging polyhedral cells and/or at least some of the diverging polyhedral cells comprise a frustum or a frustal polyhedron.

6. The acoustic liner of claim 5, wherein the frustum or frustal polyhedron comprises: a trigonal frustum, a tetragonal frustum, a pentagonal frustum, a hexagonal frustum, a heptagonal frustum, an octagonal frustum, a nonagonal frustum, a decagonal frustum, a hendecagonal frustum, or a dodecagonal frustum.

7. The acoustic liner of claim 5, wherein at least some of the converging polyhedral cells comprise a frustum factor of less than 1.0 and/or at least some of the diverging polyhedral cells comprise a frustum factor of greater than 1.0.

8. The acoustic liner of claim 2, wherein at least some of the converging polyhedral cells and/or at least some of the diverging polyhedral cells comprise at least one lateral face perpendicular to a top face and/or a bottom face of the converging or diverging polyhedral cells, the top face oriented towards the inside surface of the face sheet and the bottom face oriented towards the inside surface of the back sheet.

9. The acoustic liner of claim 1, wherein at least a portion of the acoustic liner comprises a flat planar profile and/or a curvilinear planar profile.

10. The acoustic liner of claim 1, wherein at least some of the converging polyhedral cells comprise a convergence angle of within a range from 1 to 30 degrees.

11. The acoustic liner of claim 1, wherein:
at least some of the converging polyhedral cells comprise a hexagonal top face; and
at least some of the diverging polyhedral cells comprise a tetragonal bottom face.

12. The acoustic liner of claim 11, wherein:
at least some of the converging polyhedral cells comprise a plurality of lateral faces bisected by a hexagonal bottom face.

13. The acoustic liner of claim 11, wherein:
at least some of the converging polyhedral cells comprise a plurality of lateral faces converging at a lateral bottom edge.

14. The acoustic liner of claim 11, wherein:
at least some of the diverging polyhedral cells comprise a plurality of lateral faces bisected by a hexagonal top face.

15. The acoustic liner of claim 11, wherein:
at least some of the diverging polyhedral cells comprise a plurality of lateral faces bisected by a tetragonal bottom face.

16. The acoustic liner of claim 1, wherein the plurality of strips of core material in their unfolded state exhibit one or more of a linear configuration, or a curvilinear configuration, the curvilinear configuration comprising one or more of a circular configuration, and elliptical configuration, a spiral configuration, and an oscillating configuration.

17. The acoustic liner of claim 1, wherein the core material comprises one or more of a synthetic fiber and a metal alloy.

18. The acoustic liner of claim 17, wherein the synthetic fiber comprises one or more of: aramid fiber, meta-aramid fiber, para-aramid fiber, carbon fiber, polyethylene fiber, rayon, polyester, and nylon.

19. A turbomachine comprising:
a turbine; and
a nacelle surrounding the turbine, the nacelle defining an inlet and a fan duct having a duct inner wall; and
one or more acoustic liners disposed annularly along the duct inner wall, at least one of the one or more acoustic liners comprising a core layer having a plurality of strips of core material folded to form an array of oblique polyhedral cellular structures, the array of oblique polyhedral cellular structures comprising:
a plurality of converging polyhedral cells; and
a plurality of diverging polyhedral cells;
wherein at least some of the plurality of converging polyhedral cells are bisected by a polygonal bottom face and/or at least some of the plurality of diverging polyhedral cells bisected by a polygonal top face; and
wherein the array of oblique polyhedral cellular structures comprises hollow cellular structures.

20. A method of forming a core layer for use in an acoustic liner, the method comprising:
forming a plurality of strips of core material;
selectively adhering the plurality of strips of core material to one another at a multitude of adherence regions located at selected length intervals along respective strips; and
concurrently or subsequently folding each of the plurality of strips of core material, thereby separating the respective strips of core material from one another at a multitude of expansion regions respectively located between the multitude of adherence regions, to form an array of oblique polyhedral cellular structures, the array of oblique polyhedral cellular structures comprising:
a plurality of converging polyhedral cells; and
a plurality of diverging polyhedral cells;
wherein at least some of the plurality of converging polyhedral cells are bisected by a polygonal bottom face and/or at least some of the plurality of diverging polyhedral cells bisected by a polygonal top face; and
wherein the array of oblique polyhedral cellular structures comprises hollow cellular structures.

* * * * *